United States Patent
Joe et al.

(10) Patent No.: US 6,909,953 B2
(45) Date of Patent: Jun. 21, 2005

(54) SHIFT CONTROL OF CONTINUOUSLY-VARIABLE TRANSMISSION

(75) Inventors: Shinichiro Joe, Kanagawa (JP); Taketoshi Kawabe, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 134 days.

(21) Appl. No.: 10/436,077

(22) Filed: May 13, 2003

(65) Prior Publication Data

US 2003/0229437 A1 Dec. 11, 2003

(30) Foreign Application Priority Data

Jun. 5, 2002 (JP) ........................................ 2002-164850
Oct. 28, 2002 (JP) ........................................ 2002-313041

(51) Int. Cl.$^7$ .............................................. F16H 61/18
(52) U.S. Cl. ............................ 701/51; 701/55; 701/61; 477/37; 477/43; 475/207; 475/214
(58) Field of Search ............................... 701/51, 55, 61; 477/43, 37, 75, 78, 79, 107, 115; 475/207, 208, 214, 215, 216, 151, 153

(56) References Cited

U.S. PATENT DOCUMENTS

| 6,226,583 B1 | 5/2001 | Iwata | |
| 2002/0004438 A1 * | 1/2002 | Toukura et al. | 477/111 |
| 2002/0094904 A1 * | 7/2002 | Kuramoto et al. | 475/207 |
| 2003/0228952 A1 | 12/2003 | Shinichiro et al. | |

FOREIGN PATENT DOCUMENTS

| JP | 9-250618 A | 9/1997 |
| JP | 11-91413 A | 4/1999 |

OTHER PUBLICATIONS

U.S. Appl. No. 10/436,162, Shinichiro et al., filed May 13, 2003.

* cited by examiner

*Primary Examiner*—Tan Q. Nguyen
(74) *Attorney, Agent, or Firm*—Foley & Lardner LLP

(57) ABSTRACT

A toroidal continuously-variable transmission shift control apparatus includes a controlling section to control an actual transmission ratio toward a target transmission ratio by producing a control command in one of a forward traveling control mode for a forward vehicle traveling state, and a reverse traveling control mode; and a control modifying section arranged to select one of the forward traveling control mode and the reverse traveling control mode in accordance with a first parameter representing a driver's intention. The control modifying section is configured to detect a change of the vehicle traveling direction in accordance with a second parameter which is the actual transmission ratio, and to modify the shift control of the toroidal continuously-variable transmission so as to shift the actual transmission ratio to a speed decreasing side upon detection of the change of the vehicle traveling direction.

20 Claims, 22 Drawing Sheets

SHIFT CONTROL OF CONTINUOUSLY-VARIABLE TRANSMISSION

BACKGROUND OF THE INVENTION

The present invention relates to technique of controlling a continuously-variable transmission, and more specifically to a shift control based on input and output disk speeds, or to a shift control for a toroidal continuously-variable transmission having a shift hydraulic actuator used for both a forward vehicle traveling operation and a reverse vehicle traveling operation.

A Published Japanese Patent Application Kokai No. H09 (1997)-250618 shows a toroidal continuous-variable transmission (TCVT) having two different shift control hydraulic system for forward and reverse operations. A U.S. Pat. No. 6,226,583 B1 (corresponding to a Published Japanese Patent Application Kokai No. H11(1999)-91413) treats a problem of torque shift in a toroidal continuously-variable transmission.

SUMMARY OF THE INVENTION

It is an object of the present invention to provide shift control system and process for a continuously-variable transmission, devised to provide a stable shift control performance even if the rotational direction in the transmission is not detectable.

According to the present invention, a continuously-variable transmission shift control apparatus comprises: a toroidal continuously-variable transmission including a toroidal transmission unit including a power roller disposed between an input disk and an output disk, and a trunnion supporting the power roller; and a shift actuating section to incline the power roller by offsetting the trunnion to achieve a shift control of the toroidal continuously-variable transmission in response to a control command. The continuously-variable transmission shift control apparatus further comprises a target transmission ratio setting section to set a target transmission ratio; a transmission ratio sensing section ascertaining an actual transmission ratio of the toroidal continuously-variable transmission; a controlling section to control the actual transmission ratio toward the target transmission ratio by producing the control command in one of a forward traveling control mode for a forward vehicle traveling state, and a reverse traveling control mode for a reverse vehicle traveling state; and a control modifying section to select one of the forward traveling control mode and the reverse traveling control mode in accordance with a first parameter representing a driver's intention, to detect a change of a vehicle traveling direction in accordance with a second parameter which is the actual transmission ratio, and to modify the shift control of the toroidal continuously-variable transmission so as to shift the actual transmission ratio to a speed decreasing side upon detection of the change of the vehicle traveling direction.

According to another aspect of the invention, a continuously-variable transmission shift control apparatus comprises: means for determining a target transmission ratio, and an actual transmission ratio of the toroidal continuously-variable transmission; means for controlling the actual transmission ratio toward the target transmission ratio by producing the control command in one selected, from a forward traveling control mode, and a reverse traveling control mode, in accordance with a first parameter representing a driver's intention; and means for detecting a change of a vehicle traveling direction in accordance with a second parameter, and to modify the shift control of the toroidal continuously-variable transmission so as to shift the actual transmission ratio to a speed decreasing side upon detection of the change of the vehicle traveling direction.

According to still another aspect of the invention, a shift control process for a toroidal continuously-variable transmission, comprises: setting a target transmission ratio; ascertaining an actual transmission ratio of the toroidal continuously-variable transmission; controlling the actual transmission ratio toward the target transmission ratio in one of a forward traveling control mode for a forward vehicle traveling state, and a reverse traveling control mode for a reverse vehicle traveling state; selecting one of the forward traveling control mode and the reverse traveling control mode in accordance with a first parameter representing a driver's intention; detecting a change of a vehicle traveling direction in accordance with a second parameter which is the actual transmission ratio; and modifying the shift control of the toroidal continuously-variable transmission so as to shift the actual transmission ratio to a speed decreasing side upon detection of the change of the vehicle traveling direction.

The other objects and features of this invention will become understood from the following description with reference to the accompanying drawings.

DETAILED DESCRIPTION OF THE INVENTION

Figure 1:
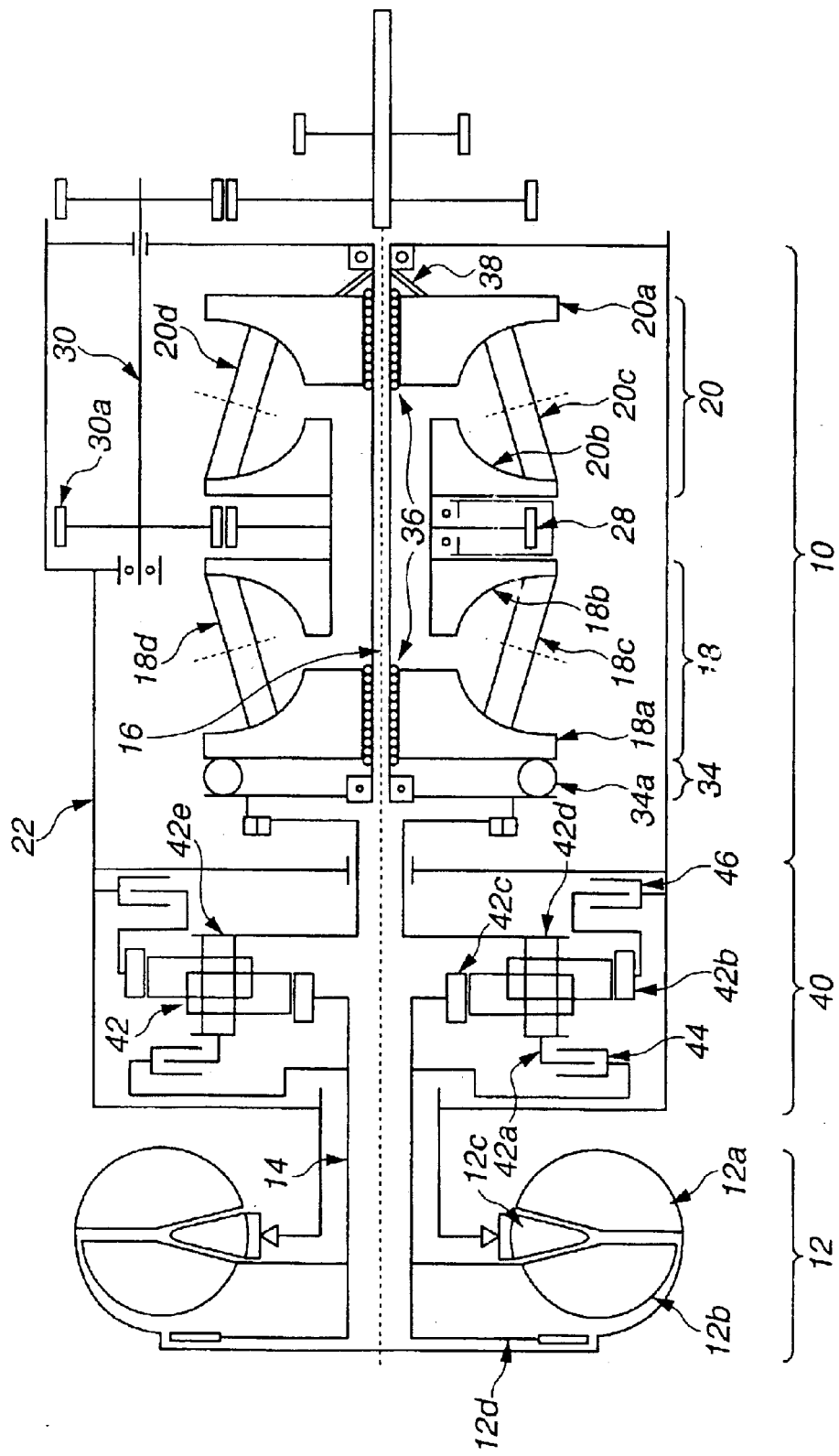
FIG. 1 is a skeleton view showing a toroidal continuously-variable transmission employed in illustrated embodiments of the present invention.

The reason for employing two different hydraulic systems for the forward and reverse operations in the before-mentioned system of Published Japanese Patent Application Kokai No. H09(1997)-250618 is as follows: A characteristic of an inclination angle (or a transmission ratio) with respect to an offset of a trunnion tends to be more or less unstable. Therefore, there is provided a precision cam (or precess cam) mechanically connected with a shift control valve for supplying an oil to a hydraulic actuator in accordance with a shift actuator displacement. The inclination angle and trunnion displacement are fed back, through the precision cam, to the shift control valve, and the shift control hydraulic system can mechanically stabilize the characteristic of the inclination angle with respect to the shift actuator displacement.

However, the rotational directions of the input and output disks differ between the forward operation and the reverse operation, and the inclination directions with respect to the up-down offset of the trunnion differ between the forward operation and the reverse operation, too. Therefore, when the shift control hydraulic system for the forward drive mode is used for the reverse operation, a shifting operation to the speed increasing side causes the oil pressure in the servo cylinder to vary in the shift direction to further increase the speed, and a shifting operation to the speed decreasing side causes a variation of the oil pressure in the direction further decreasing the speed. Thus, the use of the forward drive mode shift control valve for the reverse operation makes it difficult to control the inclination angle stably to the position corresponding to the stepper motor displacement.

Therefore, the system disclosed in the before-mentioned Japanese Patent Application Kokai No. H09(1997)-250618 uses shift control hydraulic systems having different polarities for the forward operation and the reverse operation. Because the target transmission ratio in the reverse operation is fixed at a final reduction ratio in general, the shift control hydraulic system for the reverse mode is provided with no stepper motor, and the position corresponding to the stepper motor is fixed. In the shift control hydraulic system for the forward mode, the link connected with the stepper motor is fixed at the position corresponding to the final reduction ratio.

The relationship between the inclination angle and stepper motor displacement in the equilibrium state is determined in theory by the slope of the sloping surface of the precision cam and the link ratio. However, in practice, the relationship in equilibrium state between the inclination angle and the stepper motor displacement is deformed by the phenomenon called torque shift when an input torque is applied. The torque shift is caused by looseness of power roller and pivot shaft, looseness of pivot shaft and trunnion and a tilt of the sloping surface of the precision cam due to deflection of trunnion, as explained more in detail in the before-mentioned U.S. Pat. No. 6,226,583 B1.

To remove this torque shift, the system is arranged to calculate a stepper motor displacement with a PI controller receiving, as input, a deviation between the target transmission ratio and the actual transmission ratio; and thereby to remove a steady state deviation between the target transmission ratio and actual transmission ratio. In this case, the value of an integrator in the PI controller converges to a value proportional to the torque shift.

In the reverse operation making no use of the stepper motor is used, the system can not remove the steady state deviation, and hence the value of the integrator in PI controller tends to diverge. A system of an earlier technology is arranged to detect the rotational direction of the input and output disks by monitoring the value of the integrator, and to judge the rotational direction to be reverse when the integrator value becomes greater than or equal to a predetermined value (that is, the integrator value is considered to be in the divergent state).

By using a device for producing a pulse signal in synchronism with the rotation of each of the input and output disks, the system of the earlier technology calculates the disk speeds and transmission ratio (or speed ratio) from the periods of the pulse signals. At low vehicle speeds, therefore, the update interval or cycle of the transmission ratio becomes longer, and the rotation cycle might become longer than the control cycle of the PI controller to such an extent as to make it difficult to detect the rotational direction. Therefore, the system is arranged, in many cases, to stop the feedback control of the PI controller at lower vehicle speeds, and instead to perform a feedforward control toward a theoretical value of the stepper motor displacement corresponding to the final reduction ratio since the target transmission ratio at lower vehicle speeds is set equal to the final reduction ratio. Thus, in the low vehicle speed region, the PI controller is not used, and the detection of the rotation direction in the earlier technology is not available.

Even if the system is arranged to perform only the calculation of the integrator without using the output of the PI controller for the control at low speeds, the steady state error remains since the stepper motor is not driven. Accordingly, the value of the integrator diverges, and it is difficult to detect the traveling direction with the rotational directing detecting method of the earlier technology. However, the lack of ability to detect the rotational direction is not so problematical when the system employs two different shift control valves for the two different traveling directions, because the system can control the transmission ratio at low vehicle speeds stably in a torque shift range near the final reduction ratio.

In a system in which the shift control valve for the reverse vehicle operation is omitted, and the shift control valve for the forward operation is used for the reverse operation, too, the transmission ratio tends to become more or less unstable with respect to the stepper motor displacement in the reverse operation. In this case, the system controls the transmission ratio near the final reduction ratio electronically in the reverse vehicle operation. Therefore, the system requires some way to discriminate the traveling direction.

Moreover, the characteristic of the inclination angle with respect to the stepper motor displacement differs between the forward traveling direction and reverse traveling direction, and hence requires different shit controls between the forward and reverse traveling directions. Namely, the transmission ratio can diverge or oscillate when a control to stabilize an unstable controlled system (such as the power roller inclination angle in the reverse operation) is used for a stable controlled system (such as the power roller inclination angle in the forward operation.

The shift control system may be arranged to specify the controlled system (the forward operation or the reverse operation), and to change over the shift control in dependence on a range signal. However, in the case of an operation to start a vehicle on a slope with a transmission in a D range, the vehicle may move backward immediately after a release of a brake pedal. In this case, the shift control is set to the mode for the forward traveling operation, and the shift control does not match the traveling direction, so that the transmission ratio diverges to the speed decreasing side or the speed increasing side. The divergence to the speed decreasing side poses no complicated problem since an inclination stopper on the speed decreasing side limits the inclination angle, and the target transmission ratio at low vehicle speeds is the final reduction ratio. On the other hand, because the driving force decreases with a shift of the transmission ratio to the speed increasing side, the divergence to the speed increasing side could decrease the driving force below the running resistance, makes it difficult to provide desired feeling of acceleration, and make it impossible to start the vehicle on the slope at the worst. Therefore, the control system according to the illustrated embodiments of the present invention is devised to provide a stable shift control performance even if the rotational direction in the transmission is not detectable.

Figure 2:
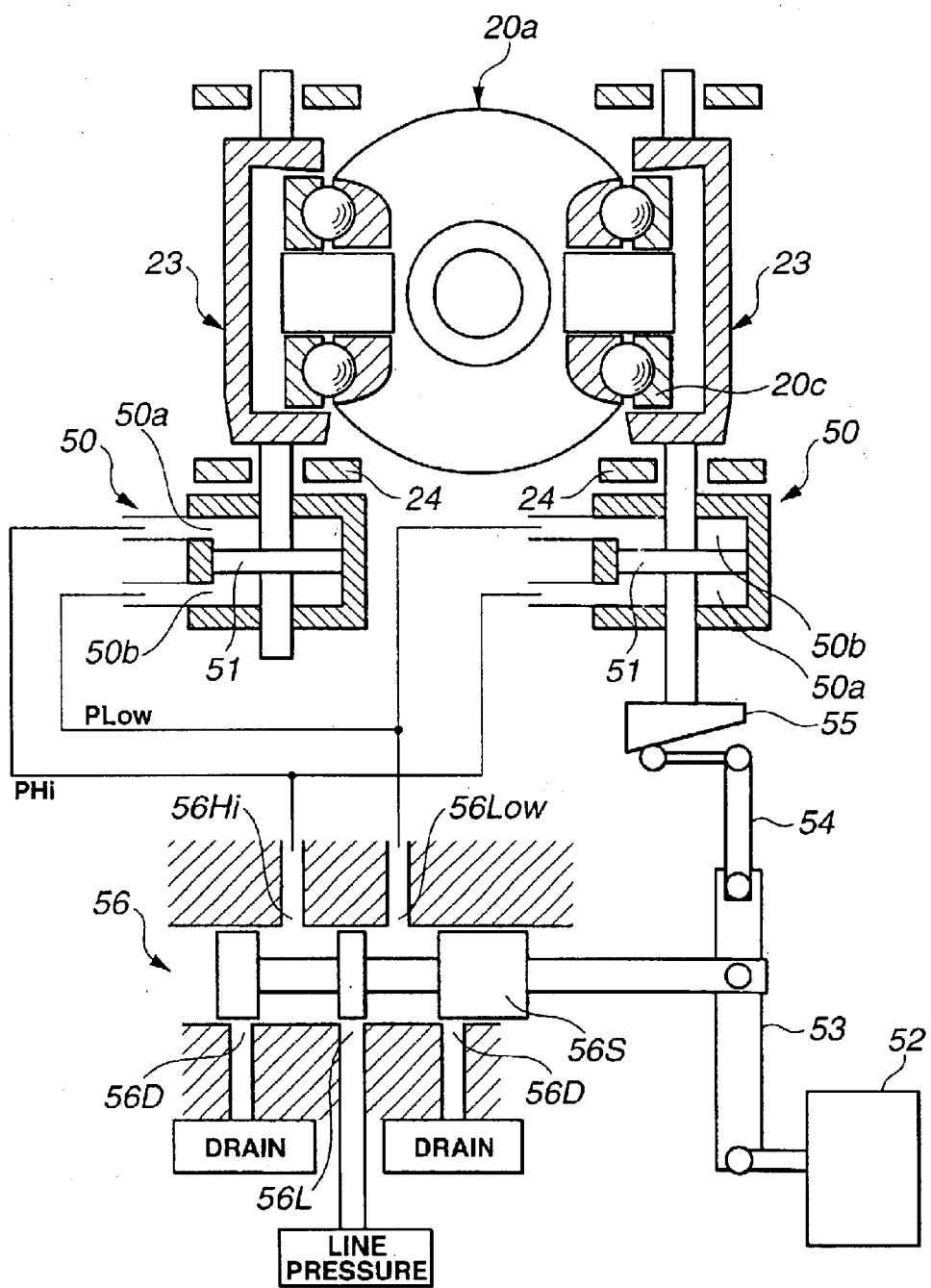
FIG. 2 is a schematic view showing the toroidal continuously-variable transmission in section of FIG. 1 and a shift control system.

FIGS. 1~11 show a first embodiment of the present invention. FIG. 1 shows a toroidal continuously-variable transmission (TCVT) 10 in the form of a skeleton, and FIG. 2 shows TCVT 10 in section, with a shift control system.

From an engine disposed, as a power source, on the left side as viewed in FIG. 1, a rotation is inputted through a torque converter 12 to TCVT 10. Torque converter 12 includes a pump impeller 12a, a turbine runner 12b and a stator 12c as usual. Torque converter 12 of this example further includes a lockup clutch 12d. An output shaft 14 of torque converter 12 is aligned with a torque transmission shaft 16 so that both shafts are coaxial with each other. First and second toroidal transmission sections or units 18 and 20 are mounted, in tandem, on this torque transmission shaft 16.

First toroidal transmission section 18 includes input and output disks 18a and 18b respectively having confronting toroidal surfaces defining therebetween a toroidal cavity, and two power rollers 18c and 18d disposed contiguously between the confronting toroidal surfaces. Similarly, second toroidal section 20 includes input and output disks 20a and 20b, and two power rollers 20c and 20d. First toroidal section 18 is located axially between torque converter 12 and second toroidal section 20.

The two output disks 18b and 20b are located axially between the two input disks 18a and 20a, as shown in FIG. 1, and splined to an output gear 28 rotatably mounted on transmission shaft 16. From output disks 18b and 20b, torque is transmitted, through output gear 28, a gear 30a engaging with output gear 28, to a counter shaft 30, and further transmitted from counter shaft 30 to an output shaft (not shown).

A loading cam mechanism 34 is provided on the outer side of first input disk 18a. Torque is inputted from torque converter 12, to this loading cam mechanism 34, through a forward reverse changeover mechanism 40. By receiving this input torque, the loading cam mechanism 34 produces a pushing force or thrust corresponding to the input torque. A loading cam 34a of loading cam mechanism 34 is rotatably mounted on transmission shaft 16, and engaged, through a thrust bearing 36, with transmission shaft 16.

A disk spring 38 is provided between second input disk 20a and the end of transmission shaft 16 on the right side as viewed in FIG. 1. An axial load or pushing force produced by loading cam mechanism 34 is applied to first input disk 18a on one hand, and further applied to second input disk 20a through transmission shaft 16 and disk spring 38. Furthermore, a preload produced by disk spring 38 is applied to second input disk 20a on one hand, and further applied to first input disk 18a through transmission shaft 16 and loading cam mechanism 34.

Forward reverse changeover mechanism 40 includes a double pinion type planetary gear mechanism 42, a forward clutch 44 capable of connecting a carrier 42a of this planetary gear mechanism 42 with torque converter output shaft 14, and a reverse brake 46 capable of connecting a ring gear 42b of this planetary gear mechanism 42, to a housing 22. Forward reverse changeover mechanism 40 delivers, to TCVT 10, forward rotation in the same rotational direction as the engine rotation when forward clutch 44 is engaged and reverse brake 46 is released, and reverse rotation in the opposite direction when forward clutch 44 is released and reverse brake 46 is engaged.

In each toroidal transmission section 18 or 20, two power rollers 18c and 18d or 20c and 20d are arranged symmetrically with respect to a center axis C. Each power roller is inclined, through a hydraulic actuator 50 and a shift control valve 56, in accordance with a vehicle operating condition. With hydraulic actuators 50 and shift control valve 56, the shift control apparatus can transmit rotation from first and second input disks 18a and 20a, to first and second output disks 18b and 20b with a continuously variable speed ratio.

FIG. 2 shows a mechanical configuration of a shift control hydraulic system for TCVT 10. Power roller 20c is supported from behind by a trunnion 23. Trunnion 23 is connected with a servo piston 51 of a hydraulic servo 50. Hydraulic servo 50 can move trunnion 23 axially or vertically as viewed in FIG. 2, in accordance with a difference between an oil pressure in a first cylinder chamber 50a and an oil pressure in a second cylinder chamber 50b.

First and second cylinder chambers 50a and 50b are connected, respectively, with a high side port 56Hi, and a low side port 56Low of shift control valve 56. In dependence on the position of a spool 56s slidably in the valve, this shift control valve 56 connects one of the high side port 56Hi and the lower side port 56Low, with a supply port 56L for supplying a line pressure to one of the high side and low side ports 56Hi and 56Low, and connects the other of the high side port 56Hi and low side portion 56Low, to a drain port 56d. Thus, shift control valve 56 varies the pressure difference in hydraulic server 50. Spool 56s is connected with a stepper motor 52 and a precision cam 55 by a link mechanism.

Precision cam 55 is fixed to one of the four trunnions 23, and arranged to translate up-down displacement and inclination angle of power roller 20a, into a displacement of a link. The displacement of spool 56s is determined by a displacement of stepper motor 52 and a displacement transmitted (fed back) through precision cam 55.

TCVT 10 achieves a shift operation by displacing the trunnion 23 upward or downward from a balance point, and allowing the power roller 20c to incline due to a vector difference between rotational vectors of input and output disks 20a and 20b. In the steady state, power roller 20c and trunnion 23 return to the balance positions, and spool 56s returns to a neutral position to close the valve. Each of trunnions 23 is provided with an inclination stopper 24 for liming the inclination angle to prevent excessive inclination of the power roller.

Precision cam 55 functions to feed back the inclination angle of power roller 20c to the displacement of spool 56s in the manner of negative feedback, and thereby compensates for a deviation from a target value of the inclination angle. At the same time, the displacements of power roller 20c and trunnion 23 from the balance points are fed back to the displacement of spool 56s in the manner of negative feedback. With this arrangement, this shift control system provides a damping effect in a shift transient state, and thereby restrains undesired hunting.

The position attained by the shift is determined by the displacement of stepper motor 52 in the following manner. When the stepper motor displacement is varied, spool 56s moves and opens the valve. Therefore, the pressure difference of servo piston 51 is varied, trunnion 23 is moved axially away from its balance position, and the power roller is inclined. When the inclination angle of the power roller reaches the angle corresponding to the stepper motor displacement, the spool 56s returns to the neutral position, and the shift operation ends.

In reverse operation, the power roller is inclined in a direction different from the inclination direction of forward operation, in response to a displacement in the upward and downward directions. As a result, the inclination angle of power roller 20c is fed back through precision cam 55, to the displacement of spool 56s in the manner of positive feedback. Therefore, in reverse operation, the power roller inclination angle does not settle down to a balanced state at the position corresponding to the stepper motor displacement, and becomes more or less unstable with respect to the stepper motor displacement.

Figure 3:
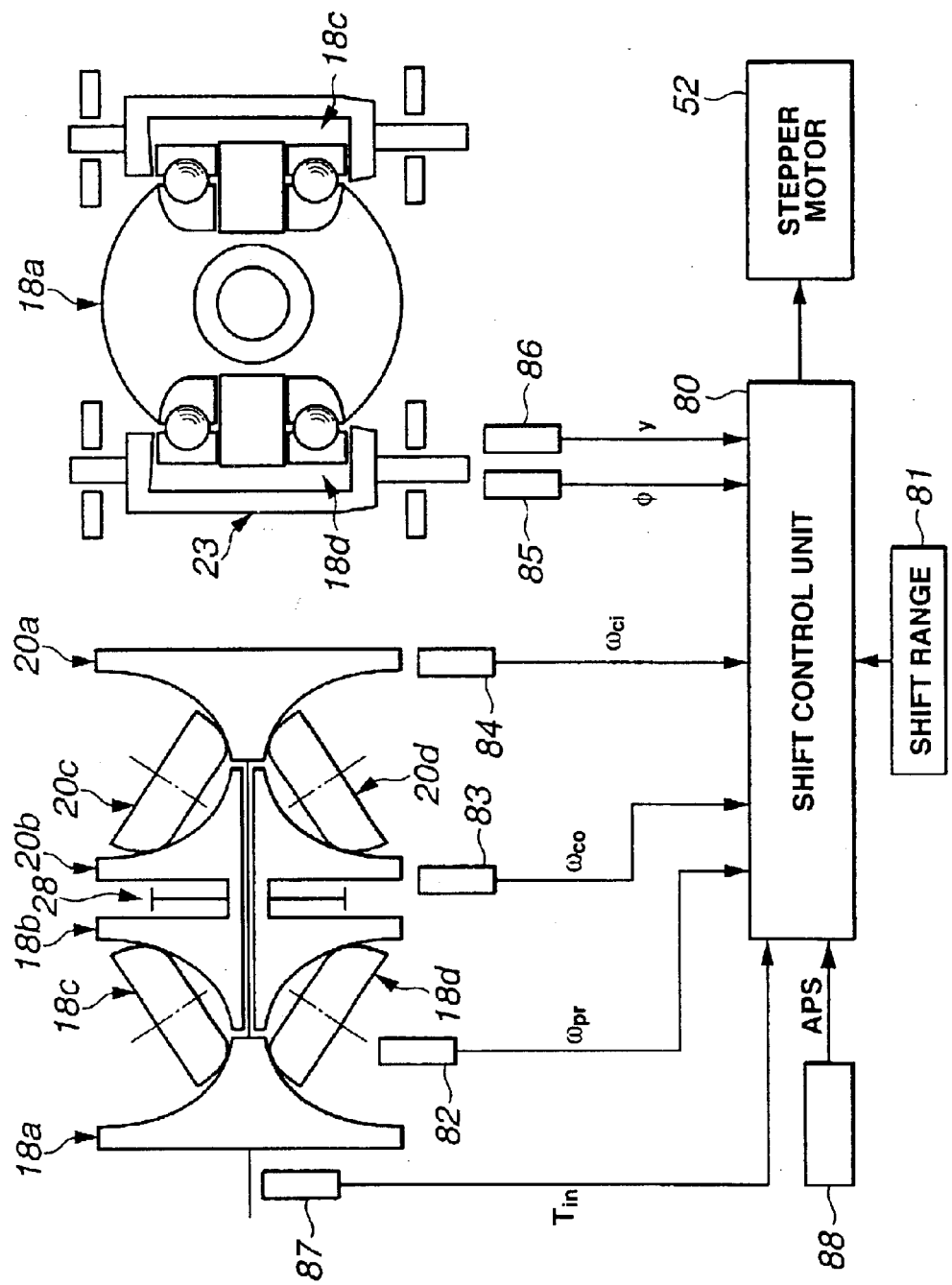
FIG. 3 is a schematic view showing a shift control system according to a first embodiment of the present invention.

FIG. 3 schematically shows the construction of TCVT 10 equipped with a reverse control system. In the mechanism according to this embodiment, the characteristic of the power roller inclination angle with respect to the stepper motor displacement tends to be unstable in the reverse drive mode. Therefore, the control system shown in FIG. 3 controls the transmission ratio or speed ratio by strategy of electronic feedback control.

An input section of the control system collects various information items needed for the control. An input disk rotation sensor 84 senses an input disk speed ($\omega_{ci}$) by measurement of the period or frequency of a pulse signal produced in synchronism with one of input disks 18a and 20a. An output disk rotation sensor 83 senses an output disk speed ($\omega_{co}$) by measurement of the period or frequency of a pulse signal produced in synchronism with one of output disks 18b and 20b. A power roller rotation sensor 82 senses a power roller speed ($\omega_{pr}$) by measurement of the period or frequency of a pulse signal produced in synchronism with one of power rollers 18c, 18d, 20c and 20d.

An inclination sensor 85 senses the inclination angle by using a rotary encoder. A trunnion displacement sensor 86 senses a trunnion displacement from the neutral point by using a displacement sensor. An accelerator position sensor 88 senses an accelerator depression quantity by using a rotary encoder. An input shaft torque sensor 87 senses an input shaft torque by using a torque sensor. A shift range or select lever 81 supplies a range signal representing a shift range (D range, R range, etc.) selected by the driver.

A shift control unit or apparatus 80 serves as a control section of this control system. Shift control unit 80 includes as a main component at least one microcomputer. Shift control unit 80 receives, as input information, the input disk speed, output disk speed, power roller speed, inclination angle, trunnion displacement, accelerator depression quantity, range signal and input shaft torque from the input section or sensor section of the control system, and calculates a command for stepper motor 52 in accordance with the input information on the various operating conditions.

Figure 4:
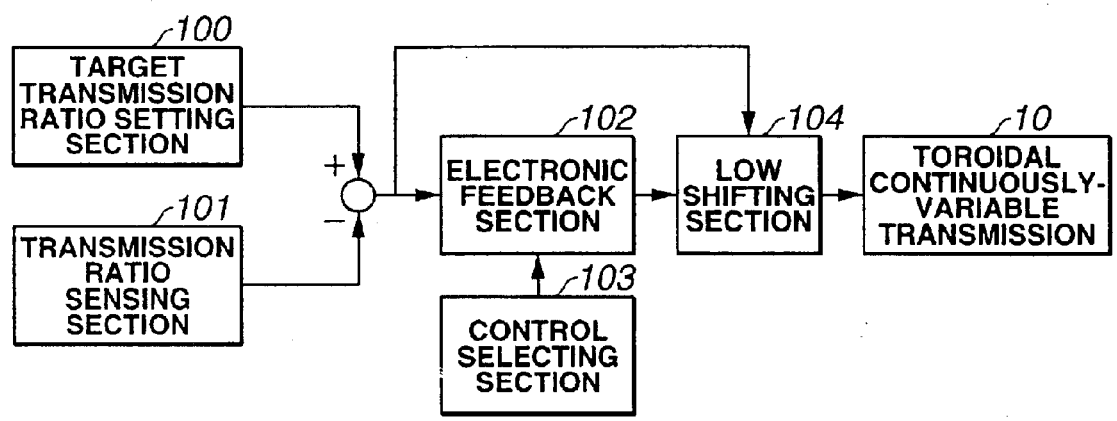
FIG. 4 is a block diagram showing the shift control system of the first embodiment.
Figure 5:
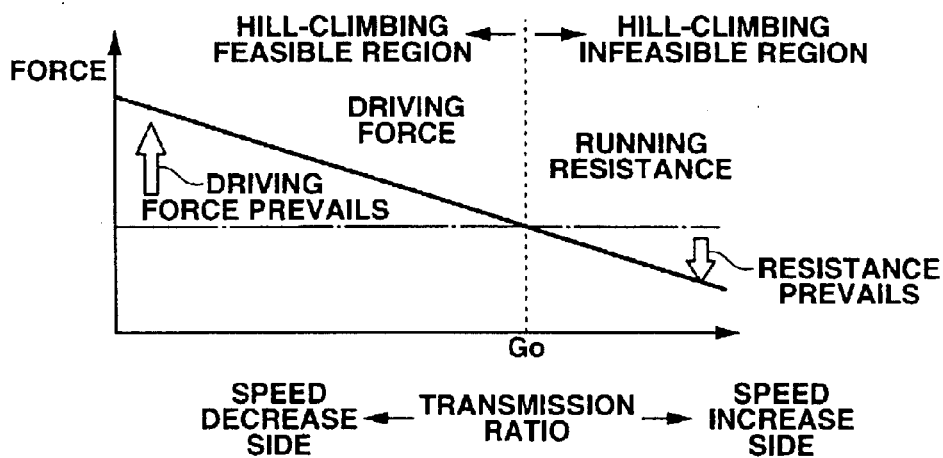
FIG. 5 is a graph showing a relationship between a transmission ratio and a driving force, used in the shift control system of the first embodiment.

FIG. 4 shows, in the form of a block diagram, a shift control performed in shift control unit (or reverse mode shift control apparatus) 80.

Figure 6:
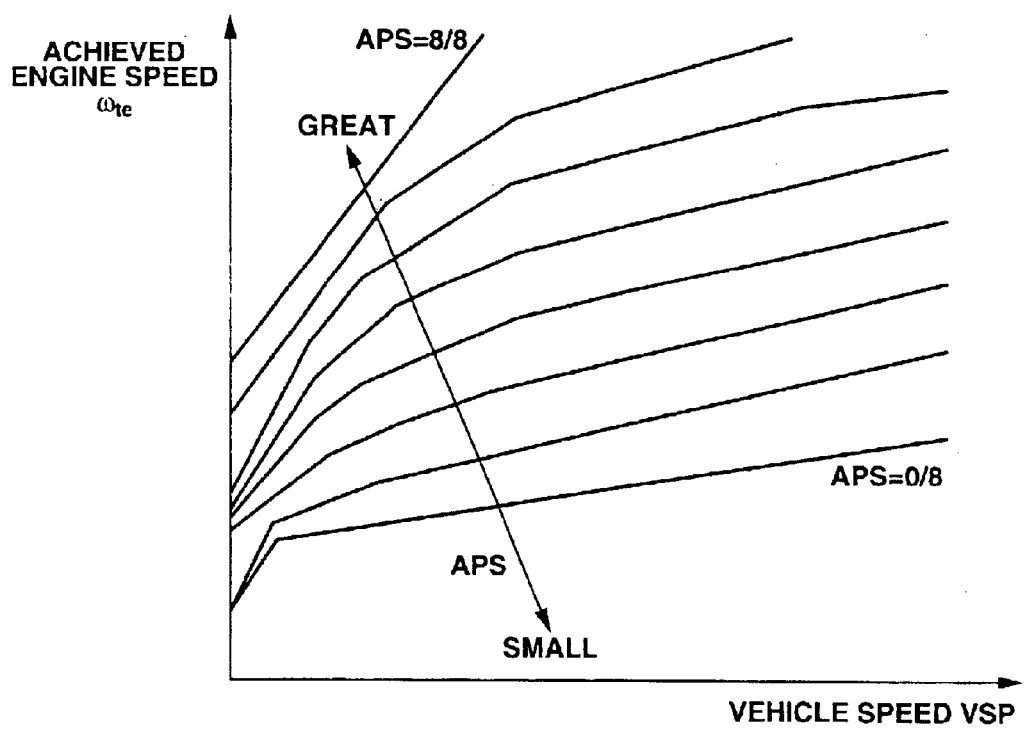
FIG. 6 is a graph showing a relationship between a vehicle speed and an achieved engine speed for each of throttle opening levels, used in the shift control system of the first embodiment.
Figure 7:
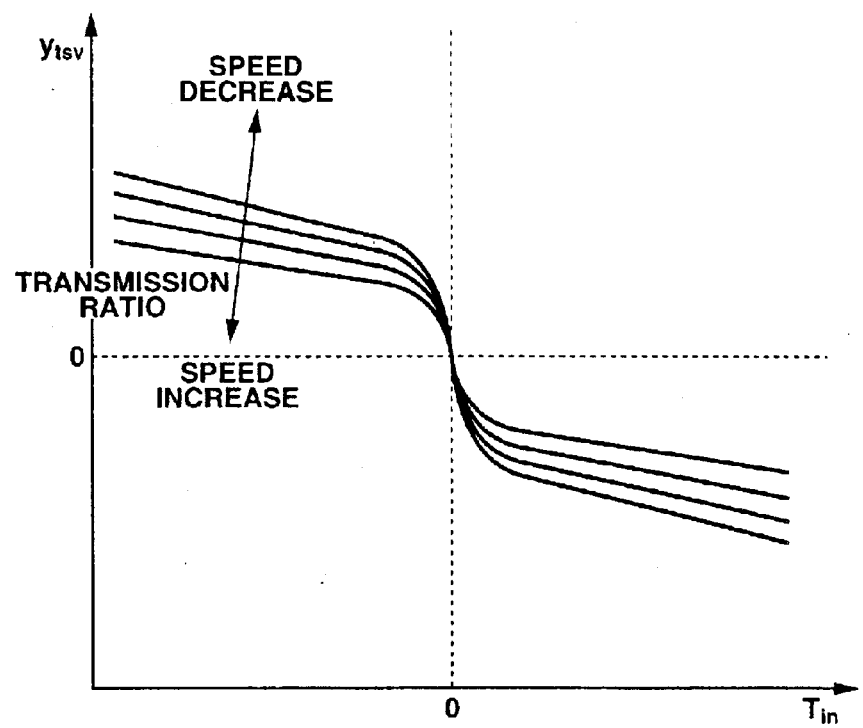
FIG. 7 is a graph showing a map for calculating a trunnion axial deviation ytsv, used in the shift control system of the first embodiment.
Figure 8:
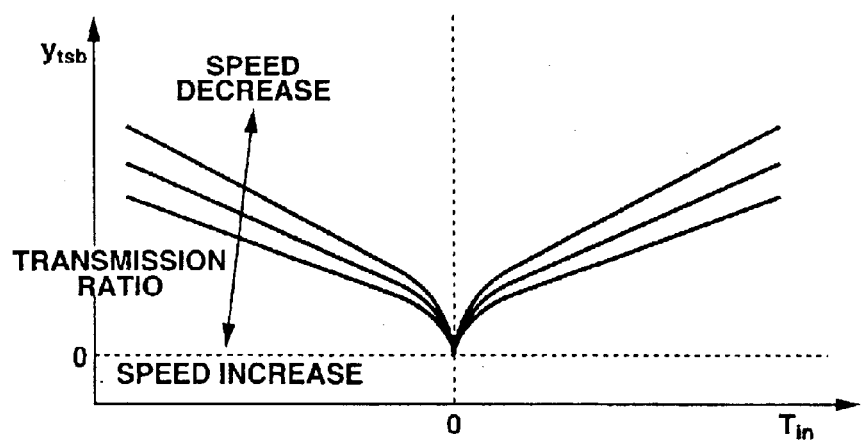
FIG. 8 is a graph showing a map for calculating a trunnion axial deviation ytsb, used in the shift control system of the first embodiment.
Figure 9:
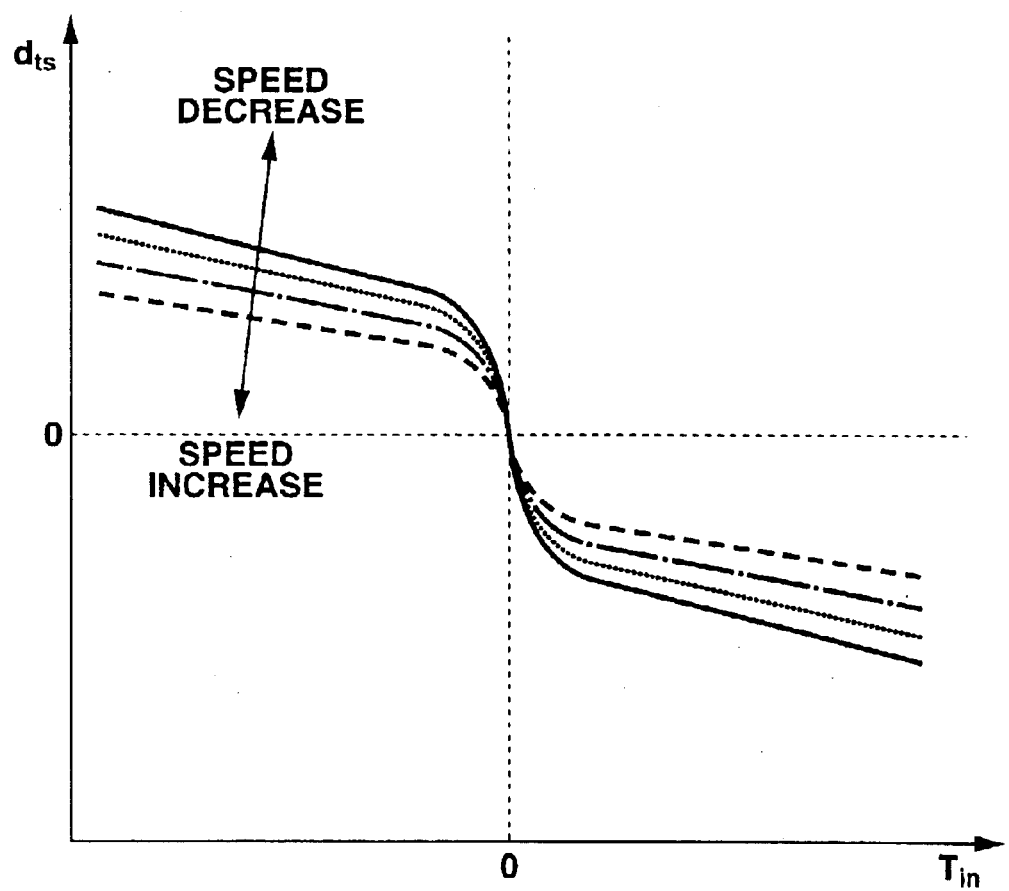
FIG. 9 is a graph showing a map representing a relationship between an input torque and a torque shift width, used in the shift control system of the first embodiment.

A target transmission ratio setting section 100 calculates a target transmission ratio G* from a vehicle speed VSP and accelerator depression quantity APS. First, target transmission ratio setting section 100 determines an achieved engine speed $\omega_{te}$ by using a map as shown in FIG. 6. In this example, the vehicle speed VSP is calculated from the output disk speed $\omega_{od}$ by using the following equation (1) representing a relation between output disk speed $\omega_{od}$ and vehicle speed VSP.

$$VSP = k_v \omega_{od} \tag{1}$$

In this equation, $k_v$ is a constant determined by a final gear ratio and a tire radius.

Then, an achieved CVT transmission ratio Gt is calculated from the achieved engine speed $\omega_{te}$ and output disk speed $\omega_{od}$, by using the following equation (2).

$$Gt = \omega_{te}/\omega_{od} \tag{2}$$

Finally, the target transmission ratio G* is calculated from the achieved CVT transmission ratio Gt by using a low-pass filter expressed by the following equation (3).

$$G^* = -CrG^* + CrGt \tag{3}$$

In this equation, Cr is a constant corresponding to a time constant to be determined in consideration of shift feeling.

A transmission ratio sensing section 101 calculates an actual or sensed transmission ratio G. The transmission ratio G can be calculated from the sensed value ($\omega_{ci}$) of input disk speed $\omega_{id}$ and the sensed value ($\omega_{co}$) of output disk speed $\omega_{od}$ by using the following equation (4).

$$G = \omega_{id}/\omega_{od} \tag{4}$$

However, the method of calculating transmission ratio G is not limited to this, and G can be calculated in various other ways. Actual transmission ratio G can be calculated from the sensed power roller inclination angle φ or the sensed power roller rotational speed $\omega_{pr}$.

In one example, the actual transmission ratio G can be calculated from the sensed inclination angle φ by using the following equation (5) representing a relationship between φ and G.

$$G = \frac{1 + \eta - \cos(2\theta - \phi)}{1 + \eta - \cos(\phi)} \tag{5}$$

In this equation, η and θ are constants determined by mechanical specification data items of TCVT 10.

Another example employs the following equations (6) and (7) representing relationship among output disk rotational speed $\omega_{od}$, input disk speed $\omega_{id}$, power roller speed $\omega_{pr}$, and inclination angle φ.

$$\omega_{id} = \frac{\sin\theta}{1 + \eta - \cos(\phi)} \omega_{pr} \tag{6}$$

$$\omega_{od} = \frac{\sin(\theta)}{1 + \eta - \cos(2\theta - \phi)} \omega_{pr} \tag{7}$$

By using these equations, the transmission ratio sensing section 101 can calculate the output disk speed $\omega_{od}$ and the input disk speed $\omega_{id}$ from the sensed power roller speed ωpr and the inclination angle φ, and calculates the transmission ratio G from the output and input disk speeds according to the equation (4).

An electronic feedback section 103 produces a drive command for stepper motor 52 in accordance with target transmission ratio G* and actual transmission ratio G to control the actual transmission ratio G toward the target ratio G* when the transmission ratio can be sensed or estimated. By using, as input, a stepper motor displacement u, and using, as state variable, a trunnion displacement y and inclination angle φ, a dynamic characteristic of TCVT 10 can be expressed by equations (8) and (9).

$$\frac{d\phi}{dt} f(\phi, \omega_{co})(y - y_{tsv}) \tag{8}$$

$$\frac{dy}{dt} = g\{-a_1(\phi - \phi_o) - a_2(y - y_{tsb}) + b(u - u_o)\} \tag{9}$$

In equations (8) and (9), f is a nonlinear function of φ and $\omega_{co}$; $a_1$, $a_2$ and b are constants determined by mechanical specification items of TCVT 10, g is a valve gain of the shift control valve; $\phi_o$ is a reference angle of the power roller inclination angle; $u_o$ is a reference stepper motor displacement; $y_{tsv}$ and $y_{tsb}$ are trunnion displacement deviations due to looseness and deformation in the trunnions and power rollers. Deviation $y_{tsv}$ is an axial trunnion deviation calculated from a $y_{tsv}$ calculation map shown in FIG. 7. Deviation $y_{tsb}$ is an axial trunnion deviation calculated from a $y_{tsb}$ calculation map shown in FIG. 8. A quantity $(y - y_{tsv})$ is a power roller offset quantity. The function f is given by:

$$f = \frac{\cos(\theta - \phi)\cos(2\theta - \phi)}{f_d} \omega_{co} \tag{10}$$

In equation (10), $f_d$ is a constant determined by the geometry of TCVT 10.

The TCVT system expressed by equations (8) and (9) is a controllable observable system when the inclination angle φ is regarded as the output of the TCVT system. Therefore, the system can stabilize the inclination angle (or the transmission ratio) by feedback control of the state variable. In this example, the characteristic of the transmission ratio with respect to the target transmission ratio is stabilized by the use of a PID controller expressed by the following equation (11).

$$u = \left(k_P + k_D s + \frac{k_I}{s}\right)(G^* - G) \tag{11}$$

In equation (11), $K_P$, $K_D$ and $K_I$ are control gains of the PID controller, and s is a Laplace operator. The quantity f becomes positive or negative in dependence on the positive/negative state of TCVT output shaft rotation speed $\omega_{co}$, as expressed by equation (10). Therefore, the characteristic of inclination angle φ with respect to stepper motor displacement u as expressed by equation (8) and (9) is stable when f is positive, and unstable when f is negative. This means that the characteristic of inclination angle φ with respect to stepper motor displacement u is stable in the forward drive mode, and unstable in the reverse drive mode.

This control system changes the control gains of the PID controller in response to changes in the positive/negative state. The control of the PID controller is a forward drive mode feedback control when control gains for forward drive mode are used, and a reverse drive mode feedback control when control gains for the reverse drive mode control are used.

A control selecting section 103 selects one of the forward drive mode feedback control and the reverse drive mode feedback control, in accordance with driver's intention. In this example, by checking the range signal from the shift range 81, the control selecting section 103 selects the forward mode feedback control in the case of D range, and selects the reverse mode feedback control in the case of R range.

A low shifting section (or down shifting section) 104 compares the actual transmission ratio G with target transmission ratio G*. When the actual transmission ratio G becomes equal to a predetermined value on a speed increasing side of the target transmission ratio, the low shifting section 104 inhibits the selected forward feedback control or the reverse feedback control, and shifts TCVT 10 to a speed decreasing side. In this example, this predetermined value is determined by the following equation (12).

$$Gc = G^* - d_n - |d_{ts}| \tag{12}$$

In this equation, $d_n$ is a maximum value of a transmission ratio detection noise, and $d_{ts}$ is a torque shift width. Torque shift width $d_{ts}$ is calculated from input torque Tin to TCVT 10 and transmission ratio G by using a relationship shown in FIG. 9.

As one way for divergence to the speed decreasing side, the low shifting section 104 is arranged to switch the shift control to the control for the reverse drive when the forward drive mode shift control is selected by the control selecting section 103, and to the control for forward drive when the reverse drive mode shift control is selected by the control selecting section 103. With this switching operation, the control system can switch the shift control to the mode adapted to the actual heading direction rather than the driver's intention. By so doing, the control system can return, to the speed decreasing side, the transmission ratio caused to diverge to the speed increasing side with respect to the target transmission ratio.

Figure 10:
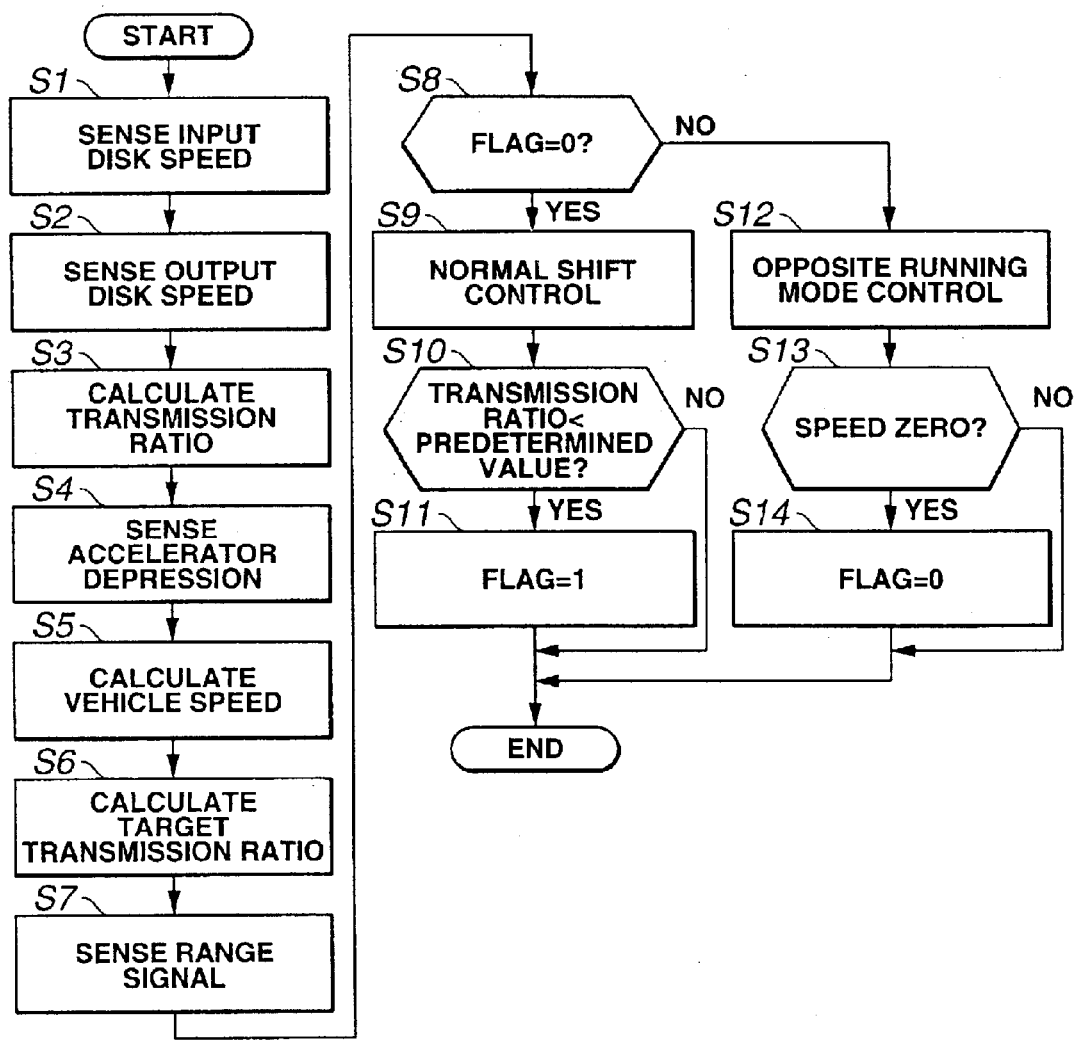
FIG. 10 is a flowchart showing a shift control process performed by the shift control system of the first embodiment.

FIG. 10 shows a shift control process performed by the shift control unit 80 at regular time intervals of a predetermined control period (20 ms in this example).

Step S1 is a step of sensing the input disk speed $\omega_{id}$ from input disk rotation sensor 84. Step S2 is a step of sensing the output disk speed $\omega_{od}$ from output disk rotation sensor 83. Step S3 is for calculating the actual transmission ratio G from input disk speed $\omega_{id}$ and output disk speed $\omega_{od}$ according to the equation (4). Step S4 is for reading the accelerator depression quantity APS from accelerator position sensor 88. Step S5 is for calculating the vehicle speed VSP from output disk speed $\omega_{od}$ according to the equation (1).

At step S6, first, the achieved engine speed $\omega_{te}$ is determined form accelerator depression quantity APS and vehicle speed VSP by using the shift map shown in FIG. 6. Then, from the achieved engine speed $\omega_{te}$ and the output disk speed $\omega_{id}$, the achieved CVT transmission ratio Gt is calculated by using equation (2). The target transmission ratio G* is then calculated from the achieved CVT transmission ratio Gt by using the low pass filter expressed by equation (3).

Step S7 following S6 is a step for checking the range signal. Step S8 determines whether a flag (FLAG) is equal to zero. The control flow is directed to step S9 for the normal mode shift control when FLAG=0, and to step S12 for the reverse mode shift control when FLAG=1.

At step S9, the control system performs, as the normal mode shift control, the feedback control in the traveling direction corresponding to the range signal by using equation (11). That is, the control system performs the forward drive mode feedback control in the case of D range, and performs the reverse drive mode feedback control in the case of R range.

At step S10, the control system compares the transmission ratio with a predetermined value or threshold (ratio), and determines whether the transmission ratio is on the speed increasing side of the predetermined value (threshold). The control system proceeds to step S11 when the transmission ratio is on the speed increasing side, and terminates this control when the transmission ratio is on the speed decreasing side. In this example, the predetermined value used in step S10 is set equal to Gc given by equation (12).

At step S11, the control system sets the flag to one (FLAG=1) on the assumption that, because of the transmission ratio being on the speed increasing side of the predetermined value, the transmission ratio is divergent and the actual moving direction is away from the direction intended by the driver.

At step S12, the control system performs, as the opposite running state (or reversal) shift control, the reverse drive mode feedback control in the case of D range being selected, and performs the forward drive feedback control in the case of selection of R range.

At step S13, the control system checks the output disk speed $\omega_{od}$ or the input disk speed $\omega_{id}$ and examines whether the disk speed is equal to zero, or not. When the disk speed is zero, the control system proceeds to step S14, and terminates this control when the disk speed is not equal to zero.

At step S14, the control system resets the flag to zero (FLAG=0) and thereby returns to the normal mode control on the assumption that the rotational speed of TCVT 10 becomes equal to zero, and there is a possibility of travel in the direction intended by the driver.

In this way, when the transmission ratio is considered to be diverging at step S10, the control system sets the flag to one, and thereby change the control mode from the normal shift control to the opposite running state (reversal) shift control. Then, the control system enables a start by switching the feedback control and returning the transmission ratio to the speed decreasing side. In the state enabling a start, the traveling direction is changed to the direction intended by the driver. Therefore, the vehicle speed and the speed of TVCT 10 are decreased to zero once, and thereafter, the vehicle starts moving in the direction intended by the driver. Therefore, the inhibition of the control selected by control selecting section 103 is cancelled by low shifting section 104, and the control system returns to the control selected by the driver when the input or output disk speed becomes equal to zero. When the input and output disk speeds become equal to zero, the vehicle might start in a direction away from the direction intended by the driver. In such a case, the low shifting section 104 can act again, and ensure the driving force beyond a predetermined level.

Figure 11:
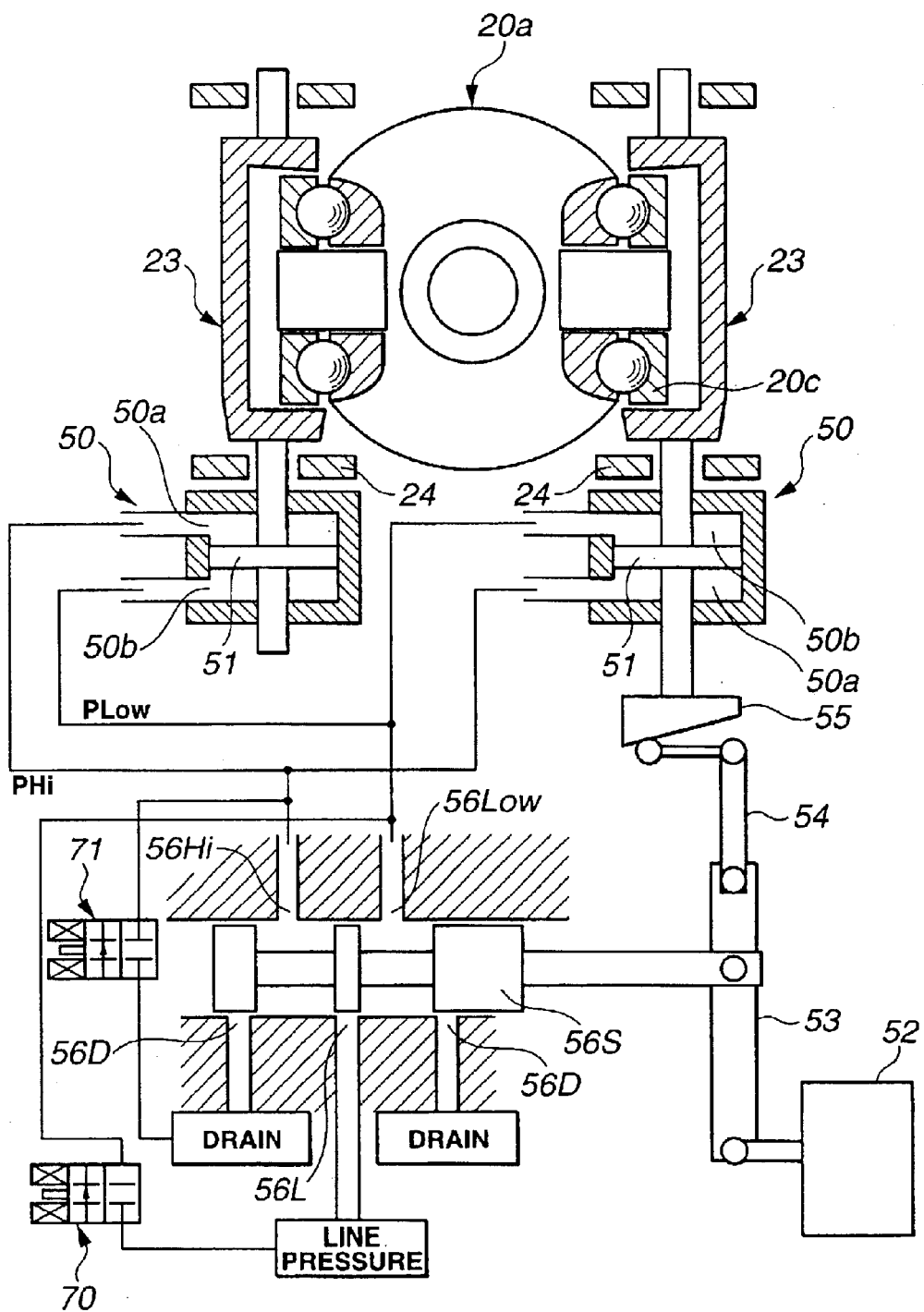
FIG. 11 is a schematic view showing a variation of the toroidal continuously-variable transmission employed in a second practical example of the first embodiment.

FIG. 11 shows a toroidal continuously-variable transmission system as a second practical example of the first embodiment. This toroidal continuously-variable transmission system is basically the same as the system shown in FIG. 2, and different only in the following points from the system of FIG. 2. The system of FIG. 11 includes a line pressure supply valve 70 for supplying the line pressure to one of the servo cylinder chambers, and a drain open valve 71 for draining the oil from the other of the servo cylinder chambers. The system of this example offsets trunnion 23 to the shift direction to the speed decreasing side, by opening these valves, and thereby varying the oil pressures in the servo cylinder.

As still another example of the first embodiment, the predetermined value (threshold) of S10 may be set equal to a transmission ratio provided with a hill-climbing ability predetermined by design specification. In this case, the predetermined value of the transmission ratio is set at a value on the speed decrease side of Go (or ico) shown in FIG. 5, to exclude the possibility that the vehicle can not start.

As a way for divergence to the speed decreasing side, the shift control system may be arranged to cause the transmission ratio to diverge to the speed decreasing side in the reverse operation including a backward motion on a slope regardless of the driver's intention. In TCVT 10, the plus or minus sign of $\omega_{co}$ changes between the forward operation and reverse operation. Accordingly, the sign of f changes between the forward operation and reverse operation, as expressed by equation (10). Furthermore, the sign of $d\phi/dt$ in equation (8) changes in dependence on the forward or reverse moving direction. Therefore, the sign of $(y-y_{tsv})$ appearing in equation (8) is determined in dependence on the shift direction. In the case of a shift operation to the speed decreasing side in the reverse movement, for example: If f<0, and $d\phi/dt<0$, then $y-y_{tsv}>0$.

Moreover, a steady state value ys of trunnion displacement y (a value of y when dy/dt=0) is given by:

$$y_s = \frac{-a_1(\phi - \phi_0) + b(u - u_o)}{a_2} + y_{tsb} \tag{13}$$

By determining the region of stepper motor displacement u so that $y_s$ satisfies the condition of y in the inequality of $y-y_{tsv}>0$, the following expression is obtained.

$$u > \frac{a_1(\phi - \phi_0) + a_2(y_{tsv} - y_{tsb})}{b} + u_0 \tag{14}$$

The region expressed by the expression (14) is the region of the stepper motor displacement in which the transmission ratio diverges on the speed decreasing side. Therefore, the control system can achieve a shift to the speed decreasing side by controlling the stepper motor displacement in the region expressed by (14).

By these operations, the control system can ensure a sufficient driving force and achieve a stable shift control with the low shifting section 104, even in a situation where the traveling direction and the direction of the control are not in agreement.

FIGS. 12~24 show a second embodiment of the present invention. A toroidal continuously-variable transmission (TCVT) 10 employed in the second embodiment is substantially identical to TCVT 10 of the first embodiment shown in FIGS. 1 and 2.

Figure 12:
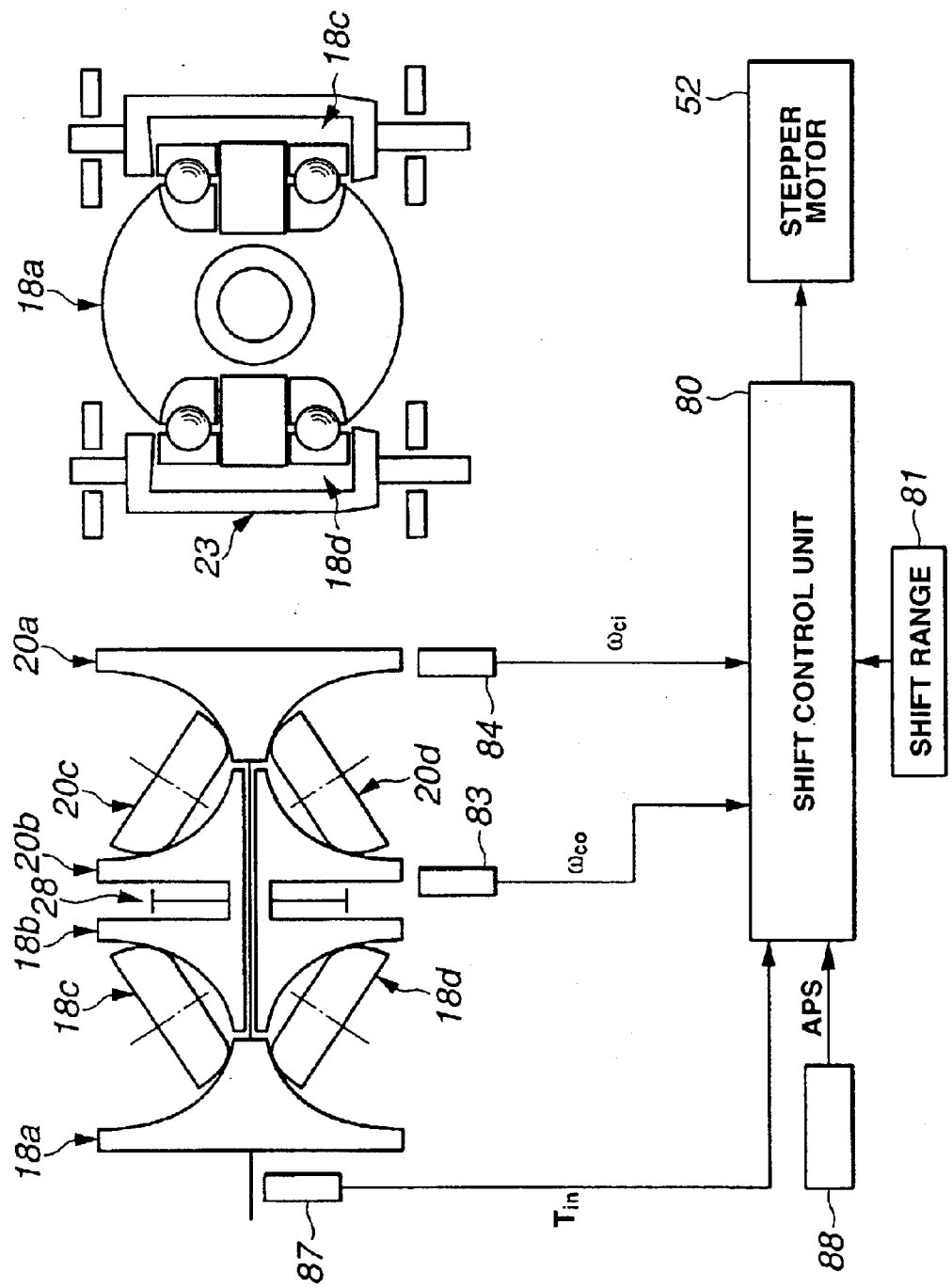
FIG. 12 is a schematic view showing a shift control system according to a second embodiment of the present invention.

FIG. 12 schematically shows the construction of TCVT 10 equipped with a shift control system of the second embodiment. The construction of FIG. 12 is almost the same as that of FIG. 3. In the mechanism according to this embodiment, the characteristic of the power roller inclination angle with respect to the stepper motor displacement tends to be unstable in the reverse drive mode. Therefore, the control system shown in FIG. 12 controls the transmission ratio or speed ratio by strategy of electronic feedback control.

The input section of the control system collects various information items needed for the control. An input disk rotation sensor 84 senses an input disk speed by measurement of the period or frequency of a pulse signal produced in synchronism with one of input disks 18a and 20a. An output disk rotation sensor 83 senses an output disk speed by measurement of the period or frequency of a pulse signal produced in synchronism with one of output disks 18b and 20b. Each of these rotation sensors 84 and 85 is capable of sensing the absolute value of the rotational speed of the rotating object, but incapable of sensing the rotational direction of the rotating object.

An accelerator position sensor 88 senses an accelerator depression quantity by using a rotary encoder. An input shaft torque sensor 87 senses an input shaft torque by using a torque sensor. A select lever or shift range 81 supplies a range signal representing a shift range (D range, R range, etc.) selected by the driver.

A shift control unit or apparatus 80 shown in FIG. 12 serves as a controller section of this control system. Shift control unit 80 receives, as input information, the input disk speed $\omega_{id}$, output disk speed $\omega_{od}$, accelerator depression quantity APS, range signal and input torque Ti from the input section or sensor section of the control system, and calculates a command for stepper motor 52 in accordance with the input information on the various operating conditions.

Figure 13:
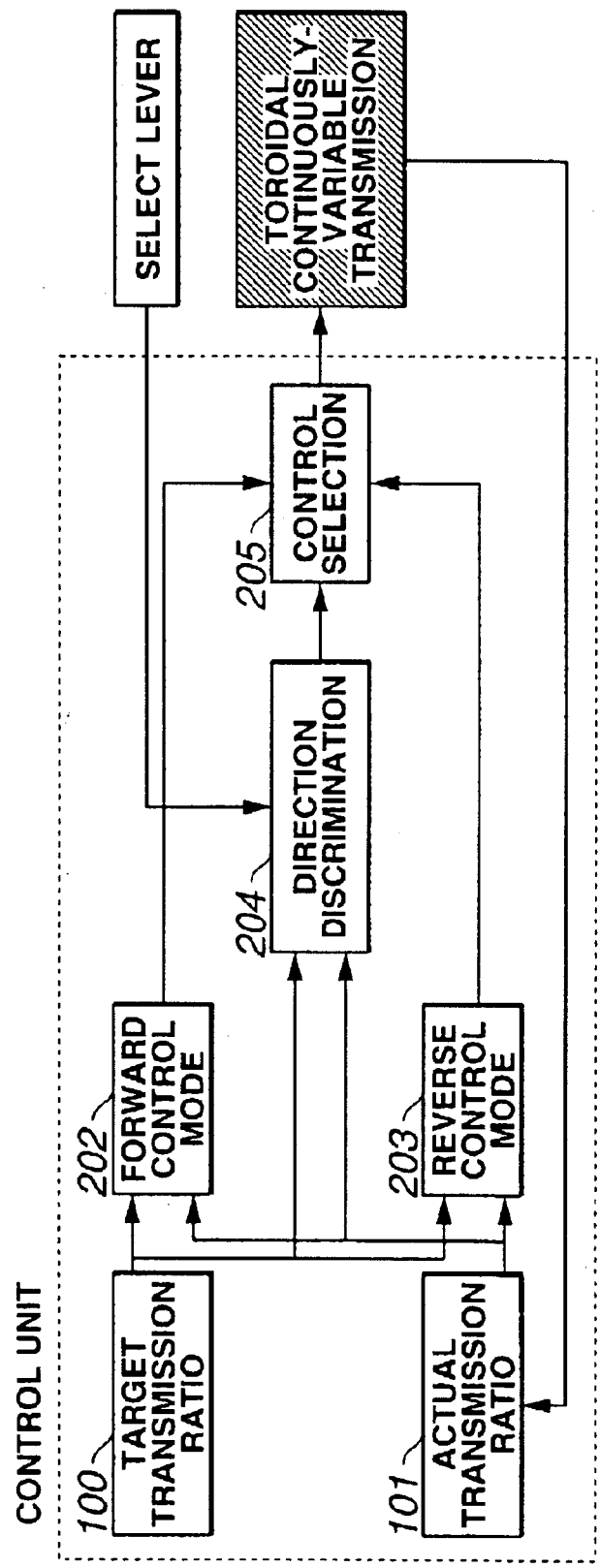
FIG. 13 is a block diagram showing the shift control system in a first practical example according to the second embodiment.

FIG. 13 shows, in the form of a block diagram, a shift control performed in shift control unit 80. A target transmission ratio setting section 100 calculates a target transmission ratio G* from a vehicle speed VSP and accelerator depression quantity APS in the same manner as in target transmission ratio setting section 100 shown in FIG. 4, of the first embodiment. A transmission ratio sensing section 101 calculates an actual or sensed transmission ratio G in the same manner as transmission ratio sensing section 101 shown in FIG. 4 of the first embodiment.

A forward control mode shift control section 202 of FIG. 13 receives the target transmission ratio G* and actual transmission ratio G, and produces the drive command for stepper motor 52 in accordance with G* and G so as to control the actual transmission ratio G toward the target ratio G* when the vehicle is in a forward motion. By using, as input, stepper motor displacement u, and using, as state variable, trunnion displacement y and inclination angle $\phi$, the dynamic characteristic of TCVT 10 can be expressed by the equations (8) and (9), as in the first embodiment. In equations (8) and (9), f is a nonlinear function of $\phi$ and $\omega_{co}$; $a_1$, $a_2$ and b are constants determined by mechanical speci-fication items of TCVT 10, g is a valve gain of the shift control valve; $\phi_o$ is a reference angle of the power roller inclination angle; $u_o$ is a reference stepper motor displacement; $y_{tsv}$ and $y_{tsb}$ are trunnion displacement deviations due to looseness and deformation in the trunnions and power rollers. Deviation $y_{tsv}$ is an axial trunnion deviation calculated from the $y_{tsv}$ calculation map shown in FIG. 7. Deviation $y_{tsb}$ is an axial trunnion deviation calculated from the $y_{tsb}$ calculation map shown in FIG. 8. The quantity $(y-y_{tsv})$ is a power roller offset quantity. The function f is given by the equation (10), as in the first embodiment. In equation (10), $f_d$ is a constant determined by the geometry of TCVT 10. At the time of forward operation, $\omega_{co}$ is positive (and f is also positive). From the equations (7), (8), (9) and (10), the characteristic of transmission ratio G with respect to stepper motor displacement u is stabilized. When $y_{tsv}$ and $y_{tsb}$ are both equal to zero, the relationship between stepper motor displacement u and transmission ratio G in the steady state is given by:

$$u = \frac{a_1}{b}(\phi - \phi_o) + u_o \tag{15}$$

For example, it is possible to calculate the target inclination angle from target transmission ratio G* by using equation (7), and to calculate the command for stepper motor displacement from this target inclination angle in the feedforward control mode by using equation (15).

When either or both of $y_{tsv}$ and $y_{tsb}$ is not equal to zero, on the other hand, the actual transmission ratio deviates from the target transmission ratio due to the torque shift, and hence the characteristic of the actual transmission ratio with respect to the target is stabilized by using a PID controller expressed by the equation (11) with control gains $K_P$, $K_D$ and $K_I$.

A reverse control mode shift control section 203 receives, as input, the target transmission ratio G* and actual transmission ratio G, and produces the command for stepper motor 52 so as to control the actual ratio G in the vicinity of target ratio G* when the vehicle is in a backward motion. The function f becomes positive or negative in dependence on the positive/negative sign of the TCVT output shaft speed $\omega_{co}$, as expressed by equation (10). Therefore, the characteristic of inclination angle $\phi$ with respect to stepper motor displacement u as expressed by equation (8) and (9) is stable when f is positive, and unstable when f is negative. That is, the characteristic of inclination angle $\phi$ with respect to stepper motor displacement u is stable in the forward vehicle operation, and unstable in the reverse vehicle operation. Therefore, the feedforward control used in forward mode shift control section 202 is not necessarily adequate for providing stable control performance. However, the TCVT system expressed by equations (8) and (9) is a controllable observable system, as mentioned before, when the inclination angle $\phi$ is regarded as the output of the TCVT system. Therefore, the system can stabilize the inclination angle (or the transmission ratio) by the feedback control of the state variable. In this example, the reverse mode shift control section 203 calculates the stepper motor drive command in the vehicle reverse operation by the use of a PID controller expressed by equation (11) with such control gains as to compensate for a deviation of the actual transmission ratio from the target ratio in the reverse operation.

A control selecting section 205 shown in FIG. 13 delivers the output of forward mode shift control section 202, as drive command, to stepper motor 52 of the toroidal continuously-variable transmission in response to a forward condition signal representing a judgment that the vehicle is in a forward motion, and delivers the output of reverse mode shift control section 203, as drive command, to stepper motor 52 in response to a reverse condition signal representing a judgment that the vehicle is in a backward motion.

A vehicle travel direction discriminating section 204 shown in FIG. 13 determines the traveling direction in accordance with the shift position of the select lever, target transmission ratio and actual transmission ratio, and produces the forward or reverse condition signal indicative of the traveling direction. The characteristic of TCVT 10 differs between the forward operation and reverse operation, and the characteristic of the shift control is changed accordingly by changing over the shift control mode in dependence on the vehicle traveling direction. If the shift control is not well adapted to the traveling direction, the transmission ratio could diverge to the speed increase side or the speed reduction side. Divergence to the speed increasing side could decrease the driving force and make it difficult to provide a desired feeling of acceleration. With the mechanical construction according to this embodiment, the control system cannot directly detect the vehicle traveling direction. Therefore, this control system is arranged to determine the traveling direction by means of software in the following manner.

The control system judges the traveling direction to be forward when the shift position is changed from a range other than the forward ranges to one of the forward ranges, and judges the traveling direction to be backward when the shift position is changed from a shift position other than the reverse range to the reverse range. When, however, the absolute value of the vehicle speed is greater than a predetermined speed value (1 km/h, for example) near zero at the time of the change of the shift position, the control system defers the change of judgment of the traveling direction until the absolute value of the vehicle speed becomes smaller than or equal to the predetermined value.

When the actual transmission ratio crosses a predetermined value (or threshold ratio) A on the speed increasing side of the target transmission ratio, from the speed decreasing side to the speed increasing side, then the control system changes over the travel direction judgment to the reverse judgment if the current judgment is forward, and changes over the travel direction judgment to the forward judgment if the current judgment is reverse. However, even when the transmission ratio crosses the predetermined value A again from the speed decreasing side to the speed increasing side before the transmission ratio returns to the speed decreasing side, the control system does not change over the travel direction judgment.

The predetermined value A is a value which cannot be reached when the judged traveling direction and the actual traveling direction are in agreement. With such a predetermined value, the control system can detect the divergence of the transmission ratio to the speed increasing side due to the opposite running state of the vehicle, and change the control to the mode adapted to the traveling direction. By so doing, the control system can return the transmission ratio to the speed decreasing side and provide a desired feeling of acceleration.

Figure 14:
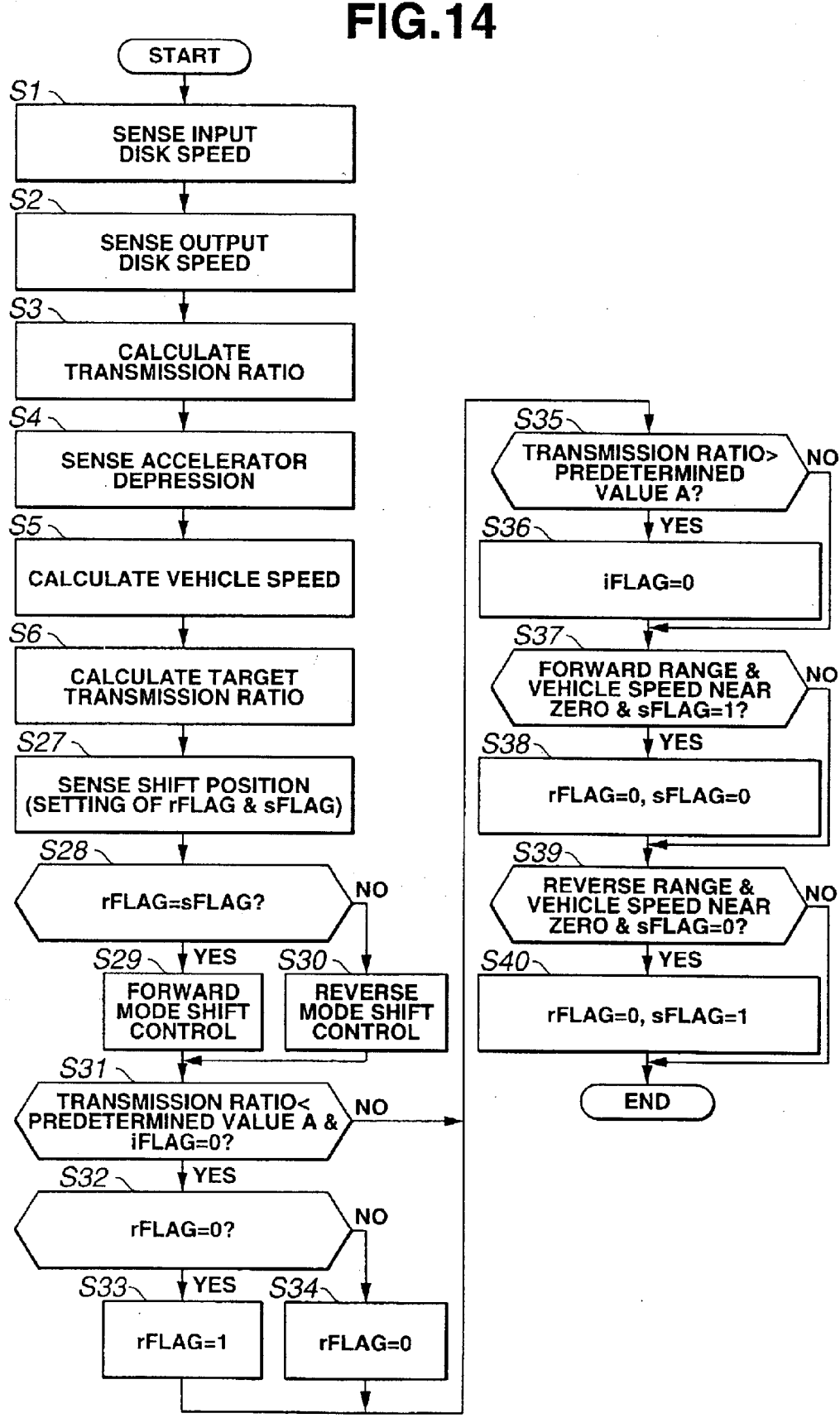
FIG. 14 is a flowchart showing a shift control process performed by the shift control system in the first example according to the second embodiment.

FIG. 14 shows a shift control process performed by shift control unit 80 of FIG. 13.

Step S1 of FIG. 14 is a step of sensing the input disk speed $\omega_{id}$ from input disk rotation sensor 84. Step S2 is a step of sensing the output disk speed $\omega_{od}$ from output disk rotation sensor 83. Step S3 of FIG. 14 is for calculating the actual transmission ratio G from input disk speed $\omega_{id}$ and output disk speed $\omega_{od}$ according to the equation (4). Step S4 is for reading the accelerator depression quantity APS from accelerator position sensor 88. Step S5 is for calculating the vehicle speed VSP from output disk speed $\omega_{id}$ according to the equation (1).

At step S6 of FIG. 14, first, the achieved engine speed $\omega_{te}$ is determined form accelerator depression quantity APS and vehicle speed VSP by using the shift map shown in FIG. 6. Then, from the achieved engine speed $\omega_{te}$ and the output disk speed $\omega_{id}$, the achieved CVT transmission ratio Gt is calculated by using equation (2). The target transmission ratio G* is then calculated from the achieved CVT transmission ratio Gt by using the low pass filter expressed by equation (3).

Step S27 following S6 in FIG. 14 is a step for checking the shift position of the driver's select lever (forward range or reverse range). An actual shift flag rsFLAG is reset to zero when the shift position is in the forward range, and rsFLAG is set to one in the case of the reverse range.

Step S28 checks an opposite motion flag rFLAG and shift flag sFLAG, and transfers control to step S29 when rFLAG=sFLAG, and to step S20 otherwise. Opposite motion flag rFLAG is a condition code which is zero when the shift position and the vehicle traveling direction are considered to be in agreement, and which is one in the case of judgment of opposite running state. Shift flag sFLAG is a condition code which is based on a shift position judgment by way of software program, distinct from the actual shift position. Shift flag sFLAG is zero in the case of forward range, and one in the case of reverse range. Each combination of opposite motion flag rFLAG and shift flag sFLAG has the following meaning. (1) rFLAG=0 and sFLAG=0: The shift position is in the forward range, and the judgment is that the vehicle motion is forward. (2) rFLAG=1 and sFLAG=0: The shift position is in the forward range, and the judgment is that the vehicle motion is backward. (3) rFLAG=0 and sFLAG=1: The shift position is in the reverse range, and the judgment is that the vehicle motion is backward. (4) rFLAG=1 and sFLAG=1: The shift position is in the reverse range, and the judgment is that the vehicle motion is forward. The judgment for the forward vehicle motion is made when rFLAG=sFLAG (that is when both flags are equal to zero, or equal to one).

Step S29 of FIG. 14 performs the forward mode shift control of forward mode shift control section 202. Step S30 performs the reverse mode shift control of reverse mode shift control section 203.

Step S31 checks the transmission ratio and an travel direction judgment inhibit flag iFLAG. Travel direction judgment inhibit flag iFLAG is a condition code indicating permission of judgment in the case of zero, and inhibition of judgment in the case of one. From step S31, the program proceeds to step S32 when the actual transmission ratio is on the speed increasing side of predetermined value A, and at the same time the travel direction judgment inhibit flag iFLAG is zero; and to step S35 otherwise.

Step S32 checks whether the opposite motion flag rFLAG is zero or not. From step S32, the program proceeds to step S33 when rFLAG is equal to zero, and the shift position and the travel direction are considered to be in agreement; and to step S34 when rFLAG is equal to one and the judgment is for the opposite motion.

Step S33 sets the opposite motion flag rFLAG to one, and changes over the judgment to a direction judgment for the opposite motion. Step S34 resets the opposite motion flag rFLAG to zero, and changes over the judgment to a judgment that the shift position and the travel direction are in agreement.

Step S35 checks whether the transmission ratio is on the speed decreasing side of predetermined value A. From step S35, the program proceeds to step S36 when the transmission ratio is on the speed decreasing side of predetermined value A; and to step S37 otherwise. Step S36 resets the travel direction judgment inhibit flag iFLAG to zero.

Step S37 checks the shift position, vehicle speed and shift flag sFLAG. From step S37, the program proceeds to step S38 when the shift position is in the forward range (rsFLAG=0), the vehicle speed is in a near-zero region (lower than or equal to 1 km/h, for example), and at the same time sFLAG=1 (the shift position judgment of program is the reverse range); and to step S39 otherwise.

Step S38 resets the opposite motion flag rFLAG to zero (rFLAG=0), and resets the shift flag sFLAG to zero (sFLAG=0).

Step S39 checks the shift position, vehicle speed and shift flag again. From step S39, the program proceeds to step S40 when the shift position is in the reverse range (rsFLAG=1), the vehicle speed is in the near-zero region, and at the same time shift flag is zero (the program shift position judgment is the forward range); and terminates this control otherwise.

Step S40 resets the opposite motion flag rFLAG to zero, sets the shift flag sFLAG to one, and then terminates this control.

Figure 15:
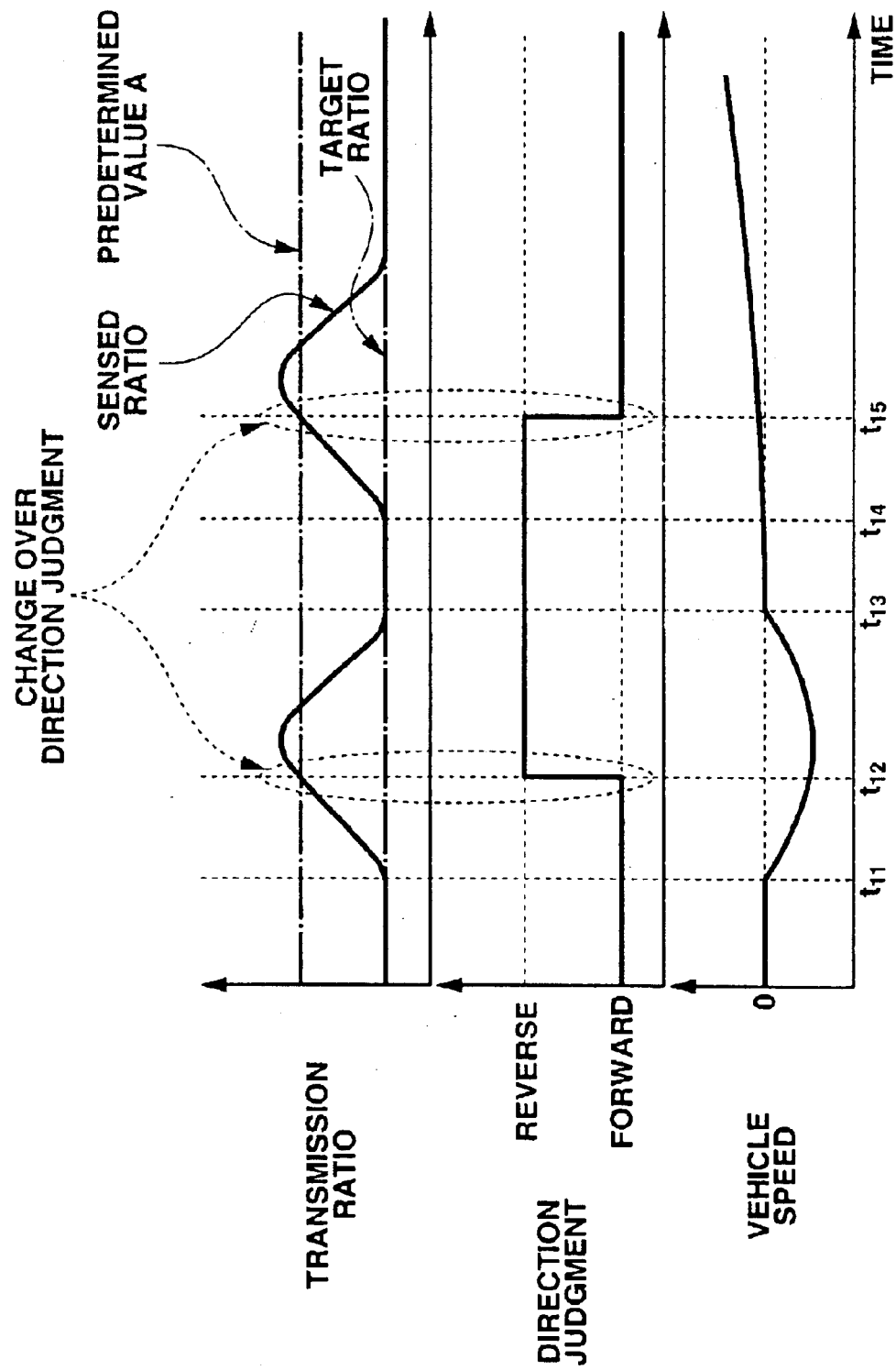
FIG. 15 is a time chart illustrating a shift control operation of the first example of the second embodiment in the case where the shift position is in a forward range.

FIG. 15 shows, in the form of a time chart, operations of this control system for the travel direction judgment. In the example of FIG. 15, the shift position is in the forward range and the vehicle is on a steep upward slope. Since the shift position is in the forward range, the judgment at first is that the travel direction is forward. When the brake pedal is released at instant t11, the vehicle moves backward while the shift position remains in the forward range. In this case, the transmission ratio is varied to the speed increasing side because the travel direction and the control are not in agreement.

However, at instant t12, the control system detects crossing of the sensed transmission ratio across the predetermined value A from the speed decreasing side to the speed increasing side, and hence changes over the direction judgment to the reverse. By so doing, the control system can return the transmission ratio to the speed decreasing side.

Thereafter, in the example of FIG. 15, the vehicle is stopped at instant t13, then the accelerator pedal is depressed at instant t14, and the vehicle moves forward after t14. Since the travel direction judgment remains in the reverse, the travel distance and the control are not in agreement, so that the transmission ratio is varied to the speed increasing side.

However, at instant t15, the control system detects crossing of the sensed transmission ratio across the predetermined value A from the speed decreasing side to the speed increasing side, and hence changes over the direction judgment to the forward. By so doing, the control system can return the transmission ratio to the speed decreasing side.

Thus, instead of sensing the vehicle travel direction, this control system according to the second embodiment of the present invention detects a condition in which the actual vehicle traveling direction and the judged travel direction are not in agreement, by means of software operation of detecting the divergence of the transmission ratio, and returns the transmission ratio to the speed decreasing side to prevent the acceleration feeling from being deteriorated by changing over the control.

By preventing a changeover of the travel direction judgment until the vehicle speed is decreased into the near-zero region, the control system can prevent the transmission ratio from diverging to the speed increasing side by a change of the control before a change of the travel direction.

Figure 16:
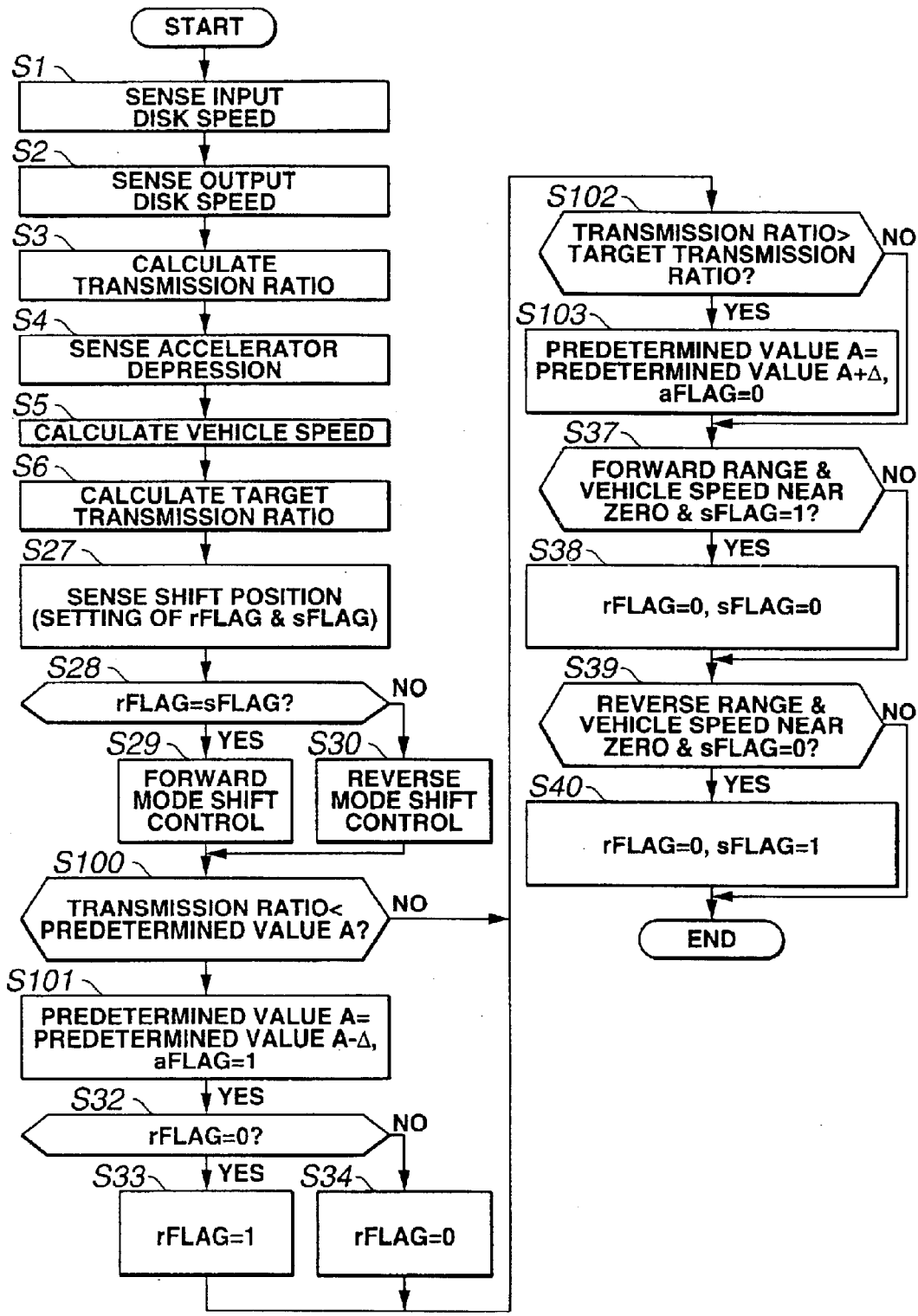
FIG. 16 is a flowchart showing a shift control process in a second practical example of the second embodiment.

FIG. 16 shows a shift control process in a second practical example of the second embodiment. The shift control of the second practical example is basically identical to the control shown in FIG. 13. Target transmission ratio setting section 100, actual transmission ratio sensing section 101, forward and reverse mode shift control sections 202 and 203, and control selecting section 105 are substantially identical to those shown in FIG. 13, so that explanation on these sections is omitted.

Travel direction discriminating section 204 determines the traveling direction of the vehicle in accordance with the shift position of the driver's select lever, target transmission ratio and actual transmission ratio, in the following manner.

The control system judges the traveling direction to be forward when the shift position is changed from a non-forward range other than the forward ranges to one of the forward ranges, and judges the traveling direction to be reverse when the shift position is changed from a non-reverse shift position other than the reverse range to the reverse range. When, however, the absolute value of the vehicle speed is greater than a predetermined value (1 km/h, for example) near zero at the time of the change of the shift position, the control system defers the change of judgment of the traveling direction until the absolute value of the vehicle speed becomes smaller than or equal to the predetermined value. When the actual transmission ratio crosses a predetermined value A on the speed increasing side of the target transmission ratio, from the speed decreasing side to the speed increasing side, then the control system changes the travel direction judgment to the reverse judgment if the current judgment is forward, and changes the travel direction judgment to the forward judgment if the current judgment is reverse. In this case, the predetermined value is shifted to the speed increasing side by $\Delta A$, and restored to the initial value when the transmission ratio returns to the vicinity of the target transmission ratio. By so doing, the control system can prevent undesired hunching in the travel direction judgment due to repetitive crossing of the sensed transmission ratio across predetermined value A even if noises are involved in the sensed transmission ratio.

FIG. 16 shows a shift control process in the second practical example of the second embodiment, performed at regular time intervals of a control cycle (20 msec, for example). The control process of FIG. 16 is almost the same as the process of FIG. 14. Specifically, steps S1~S6 and S27~S30 are identical to those of FIG. 14.

Step S100 following step S29 or S30 compares the transmission ratio with predetermined value (threshold) A as in step S31. From step S100, the program proceeds to step S101 when the actual transmission ratio is on the speed increasing side of predetermined value A; and to step S102 otherwise.

Step S101 varies the predetermined value A to the speed increasing side by an amount $\Delta A$ (or $\Delta$), and sets a predetermined value modification flag aFLAG to one. This predetermined value modification flag aFLAG is a condition code indicating such a modification that A+$\Delta A$ when aFLAG =1, and indicating the original value (A) when aFLAG=0. In this example, the amount $\Delta A$ is set equal to a maximum value of noise width in the sensed transmission ratio.

Steps S32~S34 are identical to those shown in FIG. 14. Accordingly explanation thereof is omitted.

Step S102 compares the actual transmission ratio with the target transmission ratio. From step S102, the program proceeds to step S103 when the actual transmission ratio is on the speed decreasing side of the target transmission ratio; and to step S37 otherwise.

Step S103 shifts the predetermined value A by the amount ΔA in the speed decreasing direction, to the original value (A), and resets the predetermined value modification flag aFLAG to zero.

Steps S37~S40 are identical to those shown in FIG. 14. Accordingly, explanation thereof is omitted.

Figure 17A:
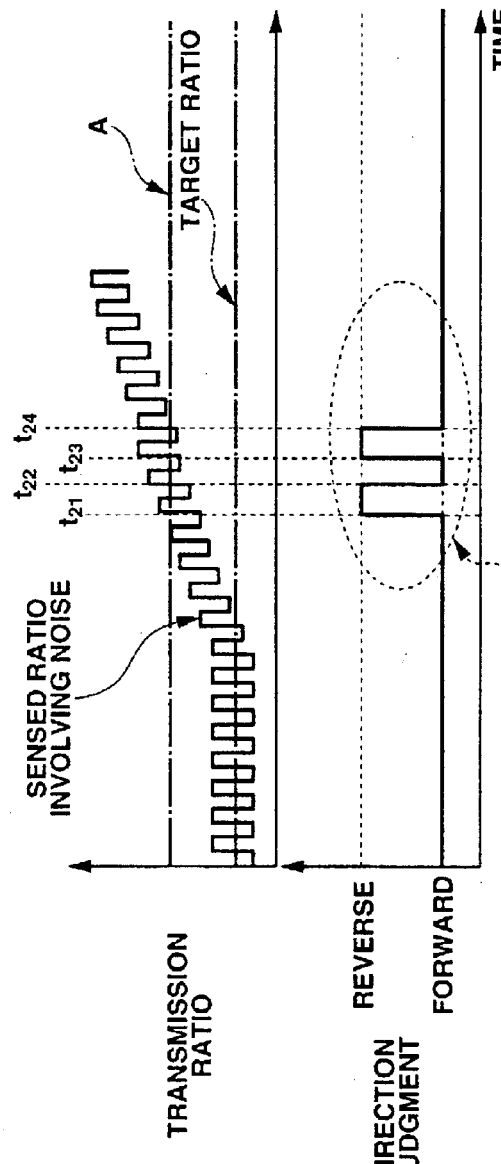
FIGS. 17A and 17B are time charts illustrating a shift control operation of the second practical example of the second embodiment in the case where the shift position is in the forward range.
Figure 17B:
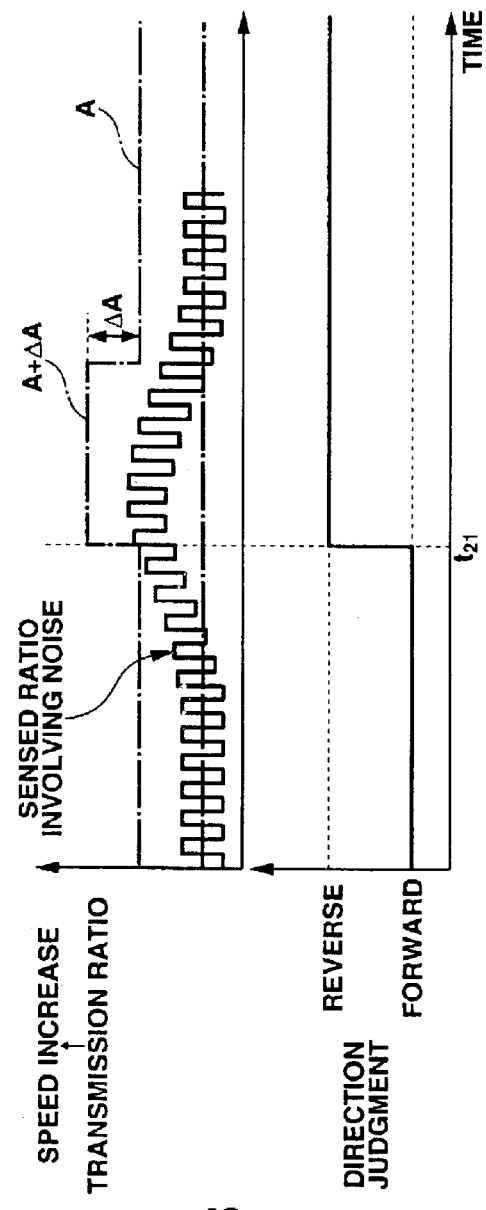

FIG. 17B shows, in the form of a time chart, performance of the control process of FIG. 16. FIG. 17A shows a comparative example in which the predetermined value A is fixed. In these examples, the shift position is in the forward range and the vehicle is on a steep upward slope. Since the shift position is in the forward range, the judgment at first is that the travel direction is forward. When the brake pedal is released, the vehicle moves backward while the shift position remains in the forward range. In this case, the transmission ratio is varied to the speed increasing side because the travel direction and the control are not in agreement. If noises are involved in the sensed transmission ratio, and the predetermined value A is held constant before and after a change of the travel direction judgment, the sensed transmission ratio first passes through the predetermined value A from the speed decreasing side to the speed increasing side at instant t21, and thereafter the sensed transmission ratio passes through the predetermined value A from the speed decreasing side to the increasing side repeatedly at instants t22, t23 and t24 as shown in FIG. 17A because of the noises. Accordingly, this system could cause undesired hunting of changes in the travel distance judgment. If the transmission ratio is shifted to the speed increasing side at the judgment for forward at instant t24, the transmission ratio could diverge to the speed increasing side due to disagreement between the actual traveling direction and the judged direction.

By contrast, the control system of the second practical example can effectively prevent control hunting and misjudgment of the travel direction by changing the predetermined value A by the amount ΔA to the speed increasing side upon changeover of the travel direction judgment so as to prevent repetitive crossing across the predetermined value A due to noises.

Figure 18:
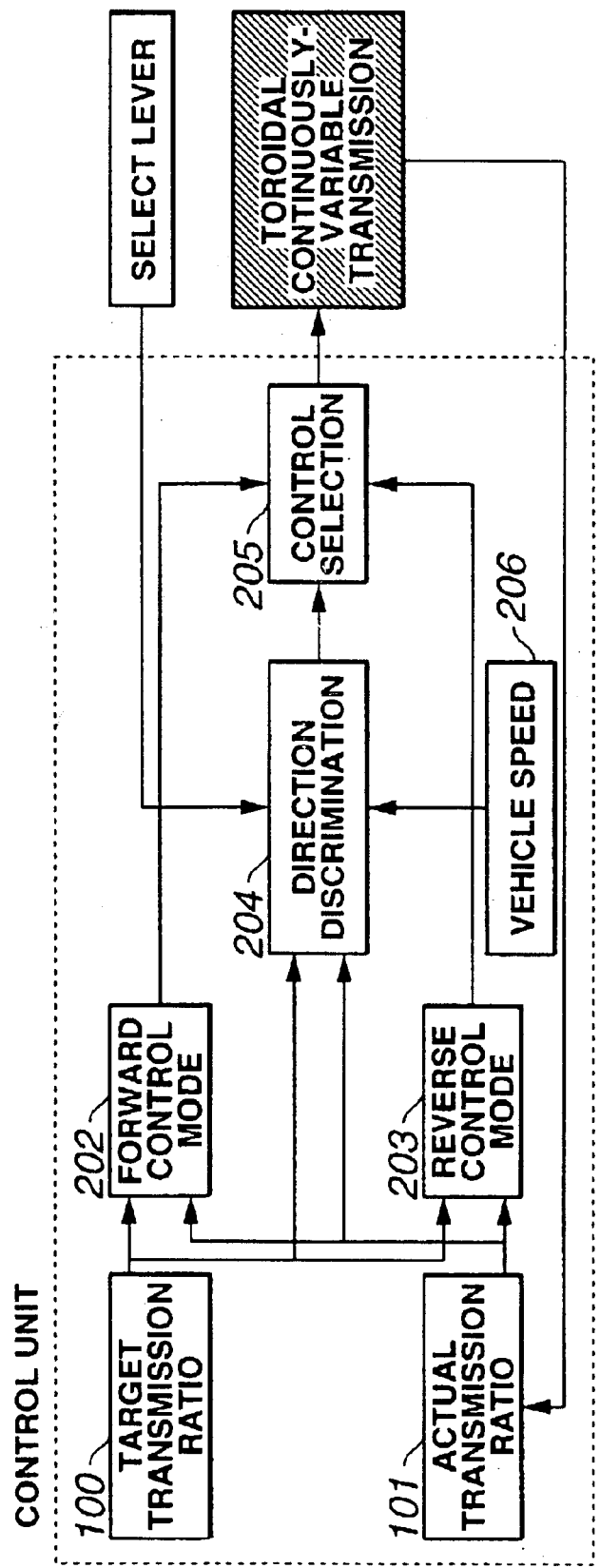
FIG. 18 is a block diagram showing a shift control system in a third practical example of the second embodiment.
Figure 19:
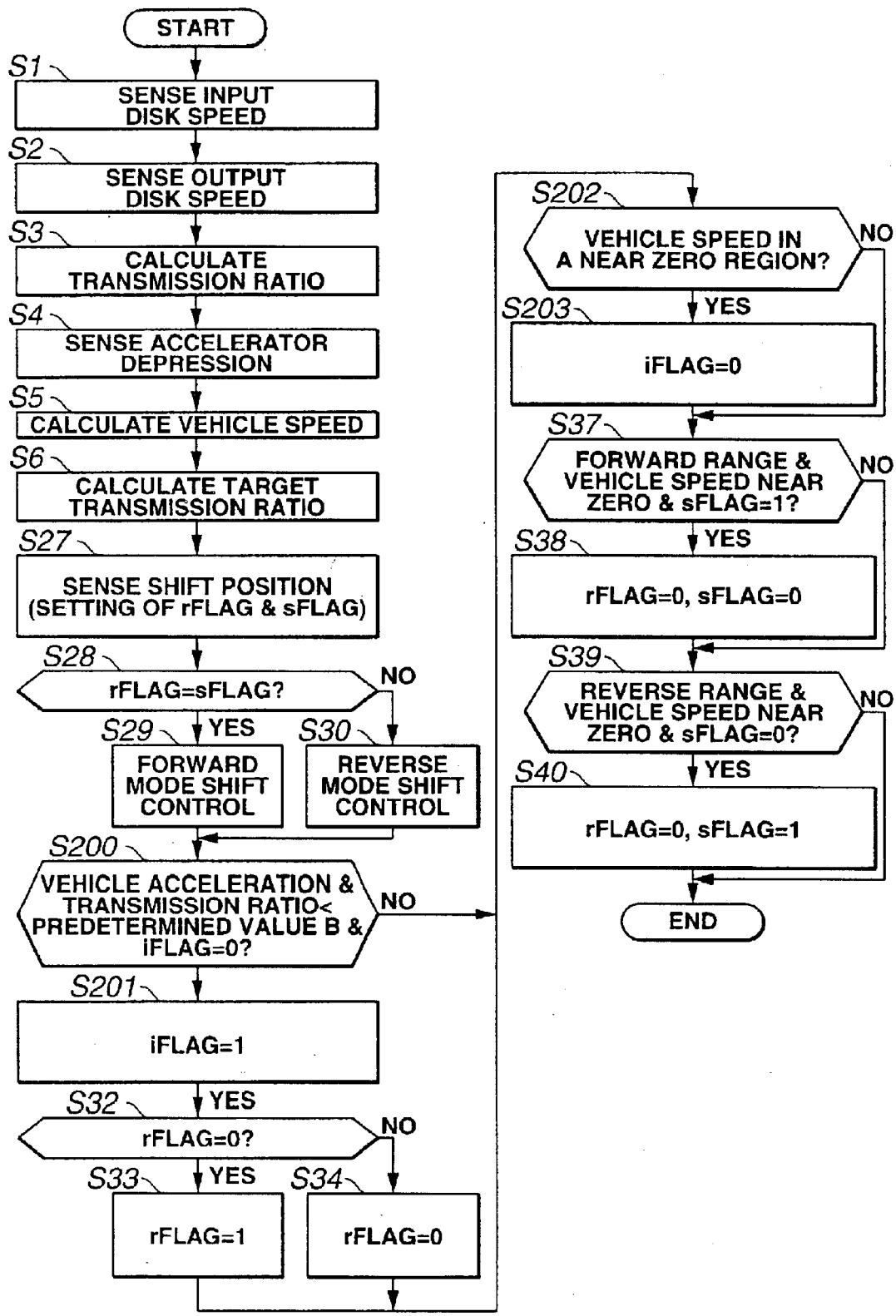
FIG. 19 is a flowchart showing a shift control process in the third practical example of the second embodiment.
Figure 20:
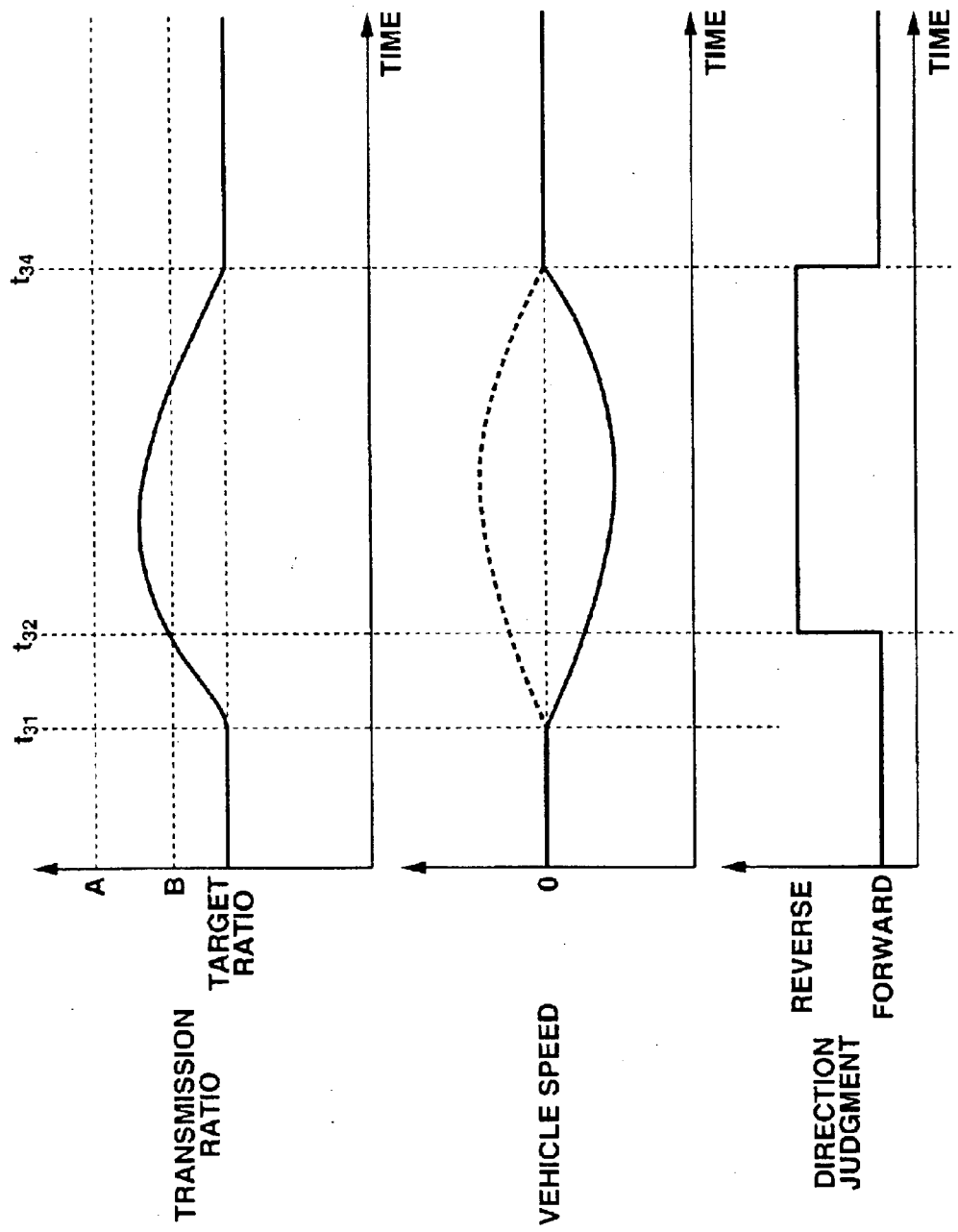
FIG. 20 is a time chart illustrating a shift control operation of the third example of the second embodiment in the case where the shift position is in the forward range.

FIGS. 18~20 show a shift control system of a toroidal continuously-variable transmission in a third practical example according to the second embodiment. The mechanical construction is substantially identical to that of the first practical example of the second embodiment.

FIG. 18 shows, in the form of a block diagram, the shift position control performed in the shift control unit 80 of the third practical example according to the second embodiment. The control system of FIG. 18 is substantially identical to the control system of FIG. 13 in target transmission ratio setting section 100, actual transmission ratio sensing section 101, forward mode shift control section 202, reverse mode shift control section 203 and control selecting section 205, so that explanation thereof is omitted.

A vehicle speed sensing section 206 of FIG. 18 calculates the vehicle speed VSP from output disk rotational speed $\omega_{od}$ by using equation (1).

Travel direction discriminating section 204 of FIG. 18 determines the traveling direction of the vehicle in accordance with the shift position of the driver's select lever, target transmission ratio, actual transmission ratio and the absolute value of vehicle speed VSP, in the following manner.

The control system judges the traveling direction to be forward when the shift position is changed from the non-forward range to the forward range, and judges the traveling direction to be reverse when the shift position is changed from the non-reverse range to the reverse range. When, however, the absolute value of the vehicle speed is greater than a predetermined value (1 km/h, for example) near zero at the time of the change of the shift position, the control system defers the change of judgment of the traveling direction until the absolute value of the vehicle speed becomes smaller than or equal to the predetermined value.

In TCVT having a torque shift characteristic in which the transmission ratio is deviated to the speed decreasing side in vehicle acceleration in the forward direction or reverse direction by the driving torque of the engine, the control system change the judgment of travel direction when the transmission ratio crosses a predetermined value (threshold) B from the speed decreasing side to the speed increasing side while the absolute value of the vehicle speed is increasing (during acceleration). However, after a changeover of the travel direction judgment, a changeover of the travel direction judgment is not performed until the absolute value of the vehicle speed enters the near-zero region.

Predetermined value (threshold) B is set to a value on the speed increasing side of a value of a noise of a sensor for sensing the transmission ratio with respect to the target transmission ratio. Therefore, the control system can detect divergence of the transmission ratio to the speed increasing side due to opposite motion earlier, and thereby change the control to the mode adapted to the travel direction. This control system can reduce the amount of temporary shift to the speed increasing side before returning the transmission ratio to the speed decreasing side, and thereby provide an acceleration feeling satisfying the driver.

Table 1 below shows the relation among vehicle acceleration/deceleration, a direction of deviation of the transmission ratio due to torque shift, and shift position. Acceleration means an increase of the absolute value of vehicle speed, and deceleration is a decrease of the absolute value of vehicle speed. Unfixed means indetermination as to the direction of deviation of the transmission ratio (lacking a parameter needed to determine the deviating direction).

TABLE 1

| | Vehicle forward motion | | Vehicle reverse motion | |
|---|---|---|---|---|
| | Acceleration | Deceleration | Acceleration | Deceleration |
| Forward shift position | Speed decreasing side | Speed increasing side | Speed increasing side | Unfixed |
| Reverse shift position | Speed increasing side | Unfixed | Speed decreasing side | Speed increasing side |

From Table 1, it is understandable that the transmission ratio deviates during acceleration to the speed increasing side when the shift position and the traveling direction are in disagreement. By using this feature, the control system of the third practical example according to the second embodiment determines the traveling direction.

FIG. 19 shows a shift control process performed by shift control unit 80 shown in FIG. 18 at regular time intervals of a control cycle (20 msec, for example). The control process of FIG. 19 is almost the same as the process of FIG. 14. Specifically, steps S1~S6 and S27~S30 are identical to those of FIG. 14.

Step S200 following step S29 or S30 checks the vehicle speed, the transmission ratio and the travel direction judgment inhibit flag iFLAG. From step S200, the program proceeds to step S201 when the vehicle is in acceleration (the absolute value of the vehicle speed is increasing), the actual transmission ratio is on the speed increasing side of predetermined value B, and at the same time the travel direction judgment inhibit flag iFLAG is zero; and to step S202 otherwise.

Step 201 sets travel direction judgment inhibit flag iFLAG to one. Steps S32~S34 are identical to those shown in FIG. 14. Accordingly explanation thereof is omitted.

Step S202 following step S33, S34 or S200 checks whether the vehicle speed is in the near-zero region. From step S202, the program proceeds to step S203 when the vehicle speed in the near-zero region equal to or lower than 1 km/h; and to step S37 otherwise.

Step S203 resets the travel direction judgment inhibit flag iFLAG to zero. Steps S37~S40 are identical to those shown in FIG. 14, so that explanation thereof is omitted.

FIG. 20 shows, in the form of a time chart, performance of the control process of FIG. 19. FIG. 20 shows a deviation of the transmission ratio due to torque shift when the vehicle is in backward motion with the shift position in the forward range, and the absolute value of the vehicle speed is increasing. The vehicle starts moving backward at instant t31, and the condition of judgment for acceleration is affirmed when the vehicle speed absolute value is increasing. In this case, as evident from Table 1, the transmission ratio deviates to the speed increasing side only when the vehicle is in the opposite running state. Therefore, the control system changes over the travel direction judgment from forward to reverse, before attainment to predetermined value A, at instant t32 when the transmission ratio during acceleration crosses the predetermined value B from the speed decreasing side to the speed increasing side. The predetermined value B is a value intermediate between the predetermined value A and the target transmission ratio, on the speed increasing side of a value of noise of sensors for sensing the transmission ratio. The travel direction judgment is changed over from reverse to forward at instant t34 when the vehicle speed reaches the near-zero region.

In this way, the control system can detect a misjudgment of the travel direction earlier, reduce the amount of temporary shift to the speed increasing side before returning the transmission ratio to the speed decreasing side, and thereby prevents the driving force from being decreased. Specifically at lower temperatures at which the driving speed of stepper motor becomes slow, a delay in detecting a misjudgment of the travel direction could increase a time required for achieving a displacement of stepper motor to a shift position on the speed decreasing side, and hence increases the amount of temporary shift to the speed increasing side. The control system of this practical example, by contrast, can prevent an undesired decrease of the driving force by detecting a misjudgment of the travel direction promptly.

By refraining from changing over the travel direction judgment until the vehicle speed is decreased into the near-zero region, the control system can prevent hunting in the travel direction judgment due to repetitive crossing across the predetermined value A or B when noises are involved in the sensed transmission ratio.

Predetermined value B is set equal to a value on the speed increasing side of a noise value of the sensing device for sensing the transmission ratio. Therefore, the control system can judge the travel direction promptly by using the characteristic of torque shift while preventing misjudgment in changeover of the travel direction due to noise in the sensed transmission ratio.

Figure 21:
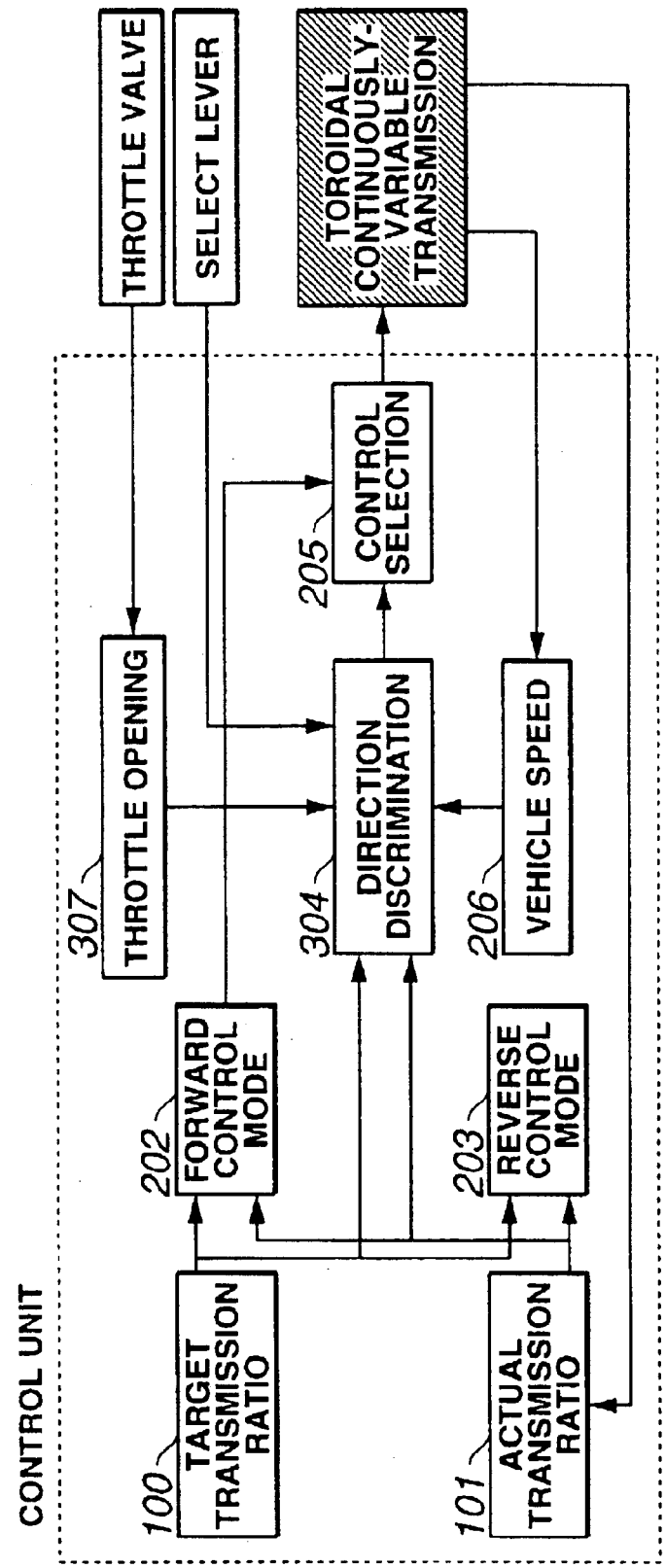
FIG. 21 is a block diagram showing a shift control system in a fourth practical example according to the second embodiment.
Figure 22:
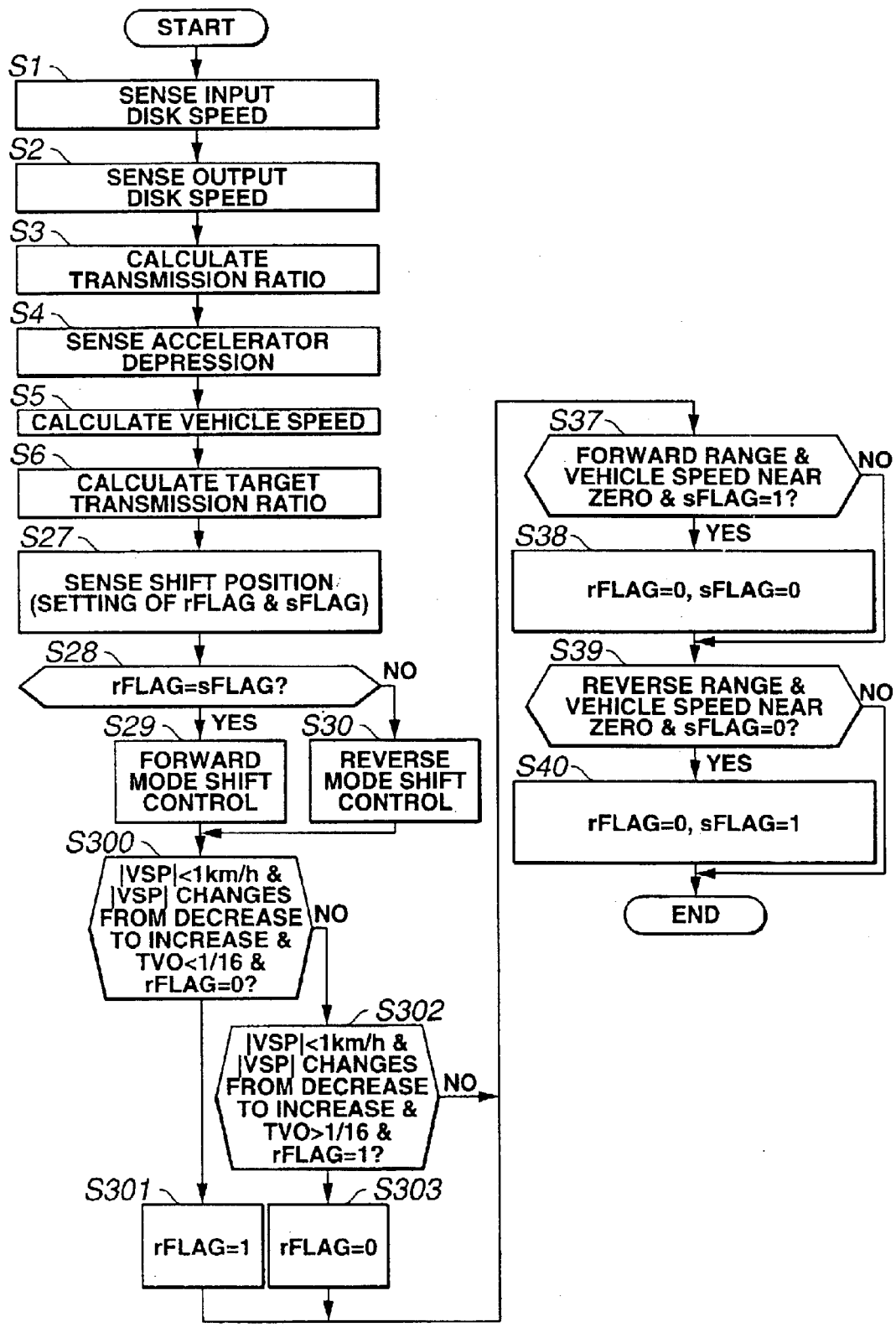
FIG. 22 is a flowchart showing a shift control process of the fourth practical example.

FIGS. 21 and 22 show a fourth practical example according to the second embodiment. The basic construction is almost the same as that of the first practical example of the second embodiment.

FIG. 21 shows, in the form of a block diagram, the shift control performed in shift control unit 80 of the fourth practical example according to the second embodiment. The control system of FIG. 21 is substantially identical to the control system of FIG. 13 in target transmission ratio setting section 100, actual transmission ratio sensing section 101, forward mode shift control section 202, reverse mode shift control section 203 and control selecting section 205. Vehicle speed sensing section 206 is substantially identical to that shown in FIG. 18. Explanation thereof is omitted.

A throttle opening sensing section 307 senses a throttle opening degree TVO with a throttle position sensor utilizing a rotary encoder.

A travel direction discriminating section 304 of FIG. 21 determines the traveling direction of the vehicle in accordance with the shift position of the driver's select lever, throttle opening, and the absolute value of vehicle speed VSP, in the following manner.

The control system judges the traveling direction to be forward when the shift position is changed from the non-forward range other than the forward ranges to one of the forward ranges, and judges the traveling direction to be reverse when the shift position is changed from the non-reverse range other than the reverse range to the reverse range. When, however, the absolute value of the vehicle speed is greater than a predetermined speed value (1 km/h, for example) near zero at the time of the change of the shift position, the control system defers the change of judgment of the traveling direction until the absolute value of the vehicle speed becomes smaller than or equal to the predetermined speed value.

The control system changes the travel direction judgment when the throttle opening is near zero (the throttle opening is equal to or smaller than 1/16 of the full opening), the vehicle speed absolute value changes from decreasing (deceleration) to increasing (acceleration), and at the same time the vehicle speed absolute value is in the near-zero region, in the state in which the direction judgment is forward and the current shift position is in the forward range or in the state in which the direction judgment is reverse and the current shift position is in the reverse range. The control system changes over the travel direction judgment when the throttle valve is open (the throttle opening is greater than 1/16 of the full opening), the vehicle speed absolute value changes from decreasing (deceleration) to increasing (acceleration), and at the same time the vehicle speed absolute value is in the near-zero region, in the state in which the direction judgment is reverse and the current shift position is in the forward range or in the state in which the direction judgment is forward and the current shift position is in the reverse range.

Thus, the control system can detect a change in the travel direction promptly, reduce the amount of temporary shift to the speed increasing side before returning the transmission ratio to the speed decreasing side, and thereby prevents the driving force from being decreased in a situation in which, after a vehicle operation ascending a steep slope, the vehicle traveling direction changes with a release of the accelerator pedal, or in a situation in which, after an descending operation along a steep hill with the accelerator pedal released in a direction opposite to the shift position, the accelerator pedal is depressed and the vehicle starts on the slope.

FIG. 22 shows a shift control process performed by shift control unit 80 shown in FIG. 21 at regular time intervals of a control cycle (20 msec, for example). The control process of FIG. 22 is almost the same as the process of FIG. 14. Specifically, steps S1~S6 and S27~S30 are identical to those of FIG. 14.

Step S300 checks the vehicle speed, throttle opening and the opposite motion flag rFLAG. From step S300, the program proceeds to step S301 when the absolute value of the vehicle speed is equal to or lower than 1 km/h, the absolute value of the vehicle speed changes from a decreasing state to an increasing state, the throttle opening TVO is equal to or smaller than 1/16 of the fully open state, and the opposite motion flag rFLAG=0; and to step S302 otherwise.

Step 301 sets the opposite motion flag rFLAG to one.

Step S302 checks the vehicle speed, throttle opening and the opposite motion flag rFLAG. From step S302, the program proceeds to step S303 when the vehicle speed is in the near-zero region (equal to or lower than 1 km/h), the absolute value of the vehicle speed changes from the decreasing state to the increasing state, the throttle opening TVO is equal to or greater than 1/16 of the fully open state, and the opposite motion flag rFLAG=1; and to step S37 otherwise.

Step S303 resets the opposite motion flag rFLAG to zero. Steps S37~S40 are identical to those shown in FIG. 14, so that explanation thereof is omitted.

Figure 23A:
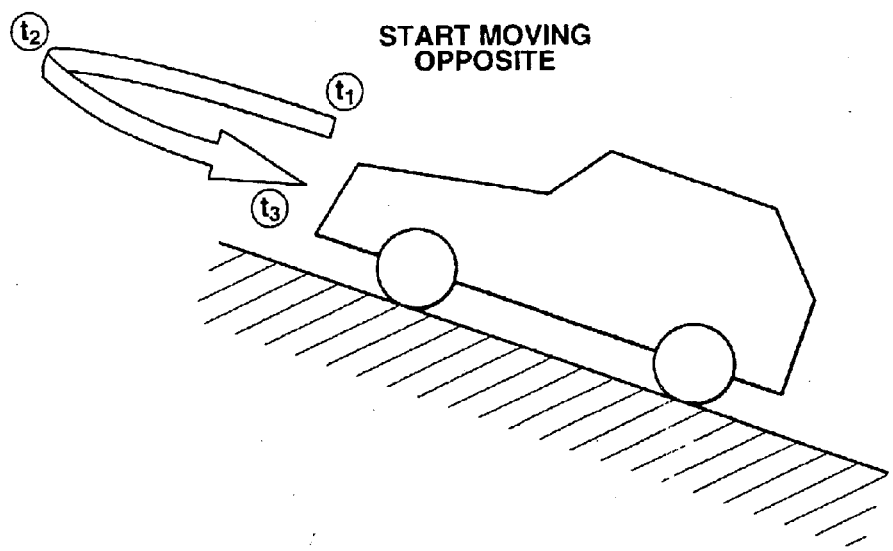
FIGS. 23A and 23B are a schematic view and a time chart showing a behavior of a vehicle to illustrate operations of the fourth practical example.
Figure 23B:
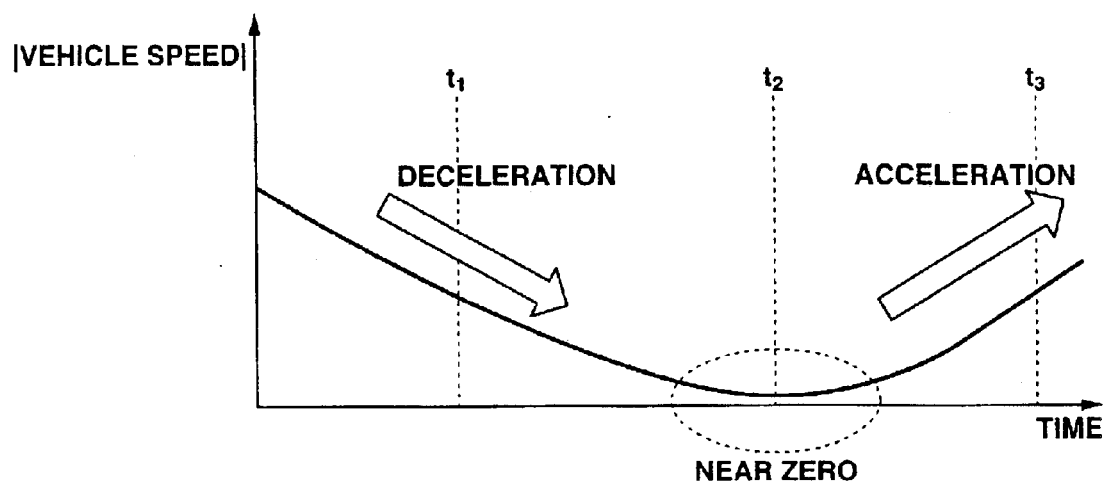
Figure 24A:
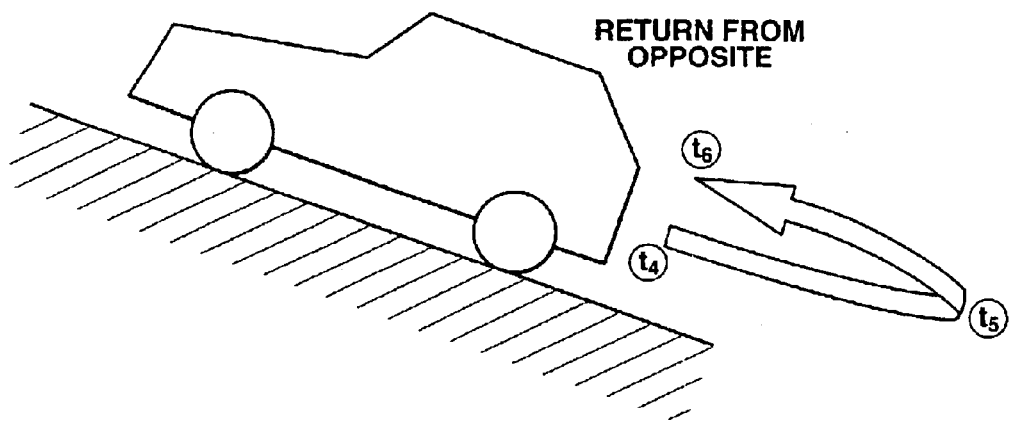
FIGS. 24A and 24B are a schematic view and a time chart showing a behavior of a vehicle to illustrate operations of the fourth practical example.
Figure 24B:
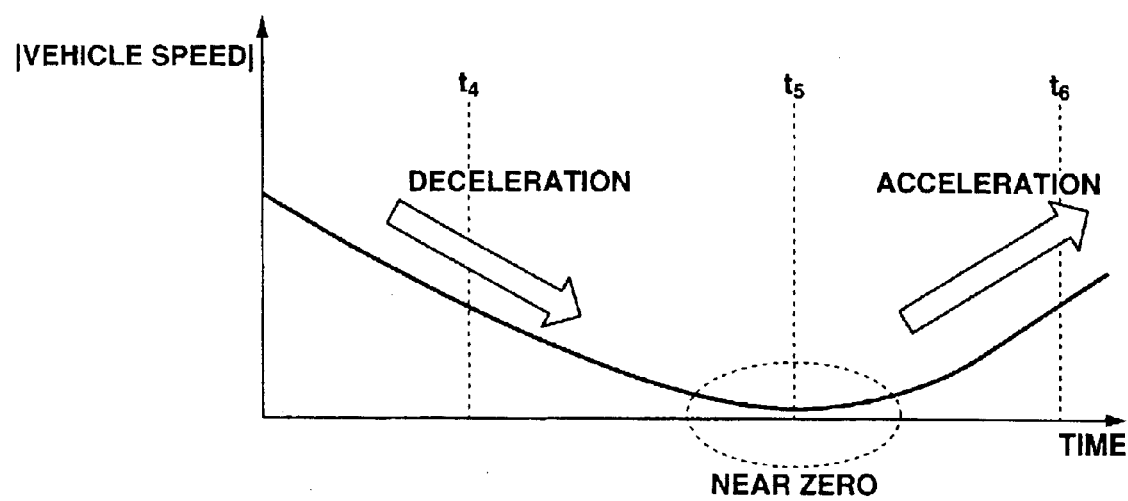

FIGS. 23 and 24 illustrate performance of the control process of FIG. 22. FIG. 23A illustrates an opposite motion of the vehicle. In this example, the vehicle moves backward on a steep hill because of the accelerator pedal being released during forward motion on the steep hill with the shift position in the forward range. FIG. 23B shows a time variation of the absolute value of the vehicle speed in the situation shown in FIG. 23A. At instant t1, the vehicle is moving forward with the accelerator pedal being depressed. Thereafter, the accelerator pedal is released, and the vehicle travel direction is changed from forward to reverse at instant t2 by the gravitation on the slope. In this case, the absolute value of the vehicle speed is decreasing from instant t1 to instant t2, and increasing from instant t2 to instant t3. The absolute value of the vehicle speed is approximately equal to zero at instant t2. Therefore, the control system changes over the travel direction judgment when the throttle opening is in the vicinity of zero, the absolute value of the vehicle speed changes from a decreasing state (vehicle deceleration: t1~t2), to an increasing state (vehicle acceleration: t2~t3), and the absolute value of the vehicle speed is in the near-zero region (at t2). Therefore, the control system can immediately detect a backward motion of the vehicle on a steep slope with the shift position being in the forward position and the accelerator pedal being released, and thereby reduce the amount of temporary shift to the speed increasing side before returning the transmission ratio to the speed decreasing side.

FIG. 24A illustrates a situation in which the vehicle is started by depression of the accelerator pedal when the vehicle moves backward on a steep upward slope with the shift position in the forward range and the travel direction is considered to be reverse. At instant t4, the vehicle is moving backward on the upward slope. Thereafter, the accelerator pedal is depressed, and the vehicle travel direction is changed from reverse to forward at instant t5. In this case, the absolute value of the vehicle speed is decreasing from instant t4 to instant t5, and increasing from instant t5 to instant t6. The absolute value of the vehicle speed is approximately equal to zero at instant t5. Therefore, the control system changes over the travel direction judgment when the throttle opening is in the vicinity of zero, the absolute value of the vehicle speed changes from a decreasing state (vehicle deceleration: t4~t5), to an increasing state (vehicle acceleration: t5~t6), and the absolute value of the vehicle speed in the near-zero region (at t5). Thus, the control system can promptly detect a forward motion of the vehicle from a backward motion on a steep slope with the shift position being in the forward position and the accelerator pedal being depressed, and thereby reduce the amount of temporary shift to the speed increasing side before returning the transmission ratio to the speed decreasing side to prevent a decrease in the driving force.

This application is based on a first prior Japanese Patent Application No. 2002-164850 filed in Japan on Jun. 5, 2002, and a second prior Japanese Patent Application No. 2002-313041 filed in Japan on Oct. 28, 2002. The entire contents of these prior Japanese Patent Applications are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A continuously-variable transmission shift control apparatus comprising:

a toroidal continuously-variable transmission including a toroidal transmission unit including a power roller disposed between an input disk and an output disk, and a trunnion supporting the power roller;

a shift actuating section to incline the power roller by offsetting the trunnion to achieve a shift control of the toroidal continuously-variable transmission in response to a control command;

a target transmission ratio setting section to set a target transmission ratio;

a transmission ratio sensing section ascertaining an actual transmission ratio of the toroidal continuously-variable transmission;

a controlling section to control the actual transmission ratio toward the target transmission ratio by producing the control command in one of a forward traveling control mode for a forward vehicle traveling state, and a reverse traveling control mode for a reverse vehicle traveling state; and a control modifying section to select one of the forward traveling control mode and the reverse traveling control mode in accordance with a first parameter representing a driver's intention, to detect a change of a vehicle traveling direction in accordance with a second parameter which is the actual transmission ratio, and to modify the shift control of the toroidal continuously-variable transmission so as to shift the actual transmission ratio to a speed decreasing side upon detection of the change of the vehicle traveling direction.

2. The continuously-variable transmission shift control apparatus according to claim 1, wherein the shift actuating section comprises a hydraulic system to incline the power roller by offsetting the trunnion in both the forward control mode and the reverse control mode; the shift control apparatus further comprises a sensing section to sense a first condition to determine the first parameter, and a second condition to determine the second parameter; and the control modifying section is configured to detect an opposite running state of the vehicle by comparing the actual transmission ratio with a predetermined threshold on a speed increasing side of the target transmission ratio, and to modify the shift control of the feedback section so as to shift the actual transmission ratio to the speed decreasing side upon detection of the opposite running state.

3. The continuously-variable transmission shift control apparatus according to claim 2, wherein the control modifying section comprises:
   a control selecting section to select one of the forward traveling control mode and the reverse traveling control mode in accordance with the first parameter representing the driver's intention; and
   a low shifting section which judges that the vehicle is in an opposite running state in which the vehicle is moving in a direction opposite to the driver's intention when the actual transmission ratio is equal to the threshold on the speed increasing side of the target transmission ratio, and which inhibits the shift control in the control mode selected by the control selecting section and instead shifts the actual transmission ratio to the speed decreasing side.

4. The continuously-variable transmission shift control apparatus according to claim 3, wherein the predetermined threshold is set equal to a maximum value of a deviation of the actual transmission ratio from the target transmission ratio in a normal running state in which an actual travel direction of the vehicle is in agreement with a vehicle travel direction intended by the driver.

5. The continuously-variable transmission shift control apparatus according to claim 4, wherein the maximum value of the deviation of the actual transmission ratio from the target transmission ratio in the normal running state is determined in accordance with a torque shift which a deviation of the actual transmission ratio due to a torque applied to the continuously-variable transmission, and a maximum value of a sensing error in the transmission ratio sensing section.

6. The continuously-variable transmission shift control apparatus according to claim 3, wherein the predetermined threshold is set equal to a transmission ratio for providing a predetermined hill-climbing ability.

7. The continuously-variable transmission shift control apparatus according to claim 3, wherein the low shifting section is configured to drive the shift actuating section to shift the actual transmission ratio to the speed decreasing side when the actual transmission ratio becomes equal to the predetermined threshold.

8. The continuously-variable transmission shift control apparatus according to claim 3, wherein the low shifting section is configured to change over a shift control mode of the toroidal continuously-variable transmission from the forward traveling control mode to the reverse traveling control mode if the forward traveling control mode is selected by the control selecting section, and from the reverse traveling control mode to the forward traveling control mode if the reverse traveling control mode is selected by the control selecting section when the actual transmission ratio becomes equal to the predetermined threshold.

9. The continuously-variable transmission shift control apparatus according to claim 3, wherein the sensing section comprises a rotation sensor to sense a rotational speed of one of the input and output disks, and the low shifting section is configured to cancel inhibition of the shift control in the mode selected by the control selecting section when the rotational speed sensed by the rotation sensor becomes equal to a minimum value after a shift operation of the actual transmission ratio to the speed decreasing side.

10. The continuously-variable transmission shift control apparatus according to claim 2, wherein the control modifying section comprises:
    a travel direction discriminating section to determine a vehicle traveling direction between a forward direction and a reverse direction, the travel direction discriminating section including;
       a first direction judging section to form a judgment to determine the vehicle traveling direction in accordance with the first parameter representing the driver's intention;
       a second direction judging section to change over the judgment on the vehicle traveling direction between the forward travel direction and the reverse travel direction on the assumption that the vehicle is in an opposite traveling state in which an actual vehicle travel direction is different from the vehicle traveling direction determined by the first travel direction judging section when the actual transmission ratio crosses a threshold on the speed increasing side of the target transmission ratio, from the speed decreasing side to the speed increasing side; and
       a third direction judging section to judge that the actual travel direction becomes in agreement with the vehicle traveling direction judged by the first travel direction judging section when, after the judgment of the opposite traveling state, the actual transmission ratio crosses the first threshold again from the speed decreasing side to the speed increasing side; and
    a control select section to allow the forward control mode when the travel direction discriminating section judges that the vehicle is in the forward traveling state, and to allow the reverse control mode when the travel direction discriminating section judges that the vehicle is in the reverse traveling state.

11. The continuously-variable transmission shift control apparatus according to claim 10, wherein the second travel direction judging section is configured to change the threshold from a first predetermined value to a second predetermined value on the speed increasing side of the first predetermined value when the second travel direction judging section changes over the judgment on the travel direction, and returns the threshold from the second predetermined value to the first predetermined value when the actual transmission ratio returns in a vicinity of the target transmission ratio.

12. The continuously-variable transmission shift control. apparatus according to claim 10, wherein the shift control apparatus further comprises a vehicle speed sensing section to ascertain an absolute vehicle speed which is an absolute value of a vehicle speed; and the second travel direction judging section is configured to change over the judgment on the travel direction between the forward travel direction and the reverse travel direction when, during an increase of the absolute vehicle speed, the actual transmission ratio crosses the threshold on the speed increasing side of the target transmission ratio from the speed decreasing side to the speed increasing side of the threshold.

13. The continuously-variable transmission shift control apparatus according to claim 10, wherein the shift control apparatus further comprises a vehicle speed sensing section to ascertain an absolute vehicle speed which is an absolute value of a vehicle speed; and the second travel direction judging section is configured to inhibit a change over of the judgment on the travel direction between the forward travel direction and the reverse travel direction after the travel direction is judged until the absolute vehicle speed is decreased into a near-zero region.

14. The continuously-variable transmission shift control apparatus according to claim 2, wherein the sensing section comprises:

a vehicle speed sensing section to ascertain an absolute vehicle speed which is an absolute value of a vehicle speed;

a throttle opening sensing section to sense a throttle opening for an engine of the vehicle; and a shift position sensing section to sense a shift position of a driver's shift lever as the first parameter; and wherein the control modifying section comprises:

a travel direction judgment section including;

a first travel direction judging section to make a travel direction judgment between a forward travel direction and a reverse travel direction in accordance with the shift position sensed by the shift position sensing section;

a further travel direction judging section to detect a change in the vehicle travel direction between the forward travel direction and the reverse travel direction in accordance with the absolute vehicle speed and the throttle opening; and a control select section to allow the forward control mode when the travel direction judgment section judges that the vehicle is in the forward travel state, and to allow the reverse control mode when the travel direction judgment section judges that the vehicle is in the reverse travel state.

15. The continuously-variable transmission shift control apparatus according to claim 14, wherein the further travel direction judging section changes over the travel direction judgment between the forward travel direction and the reverse travel direction when the throttle opening is in a near-zero opening region, the absolute vehicle speed changes from a decreasing state to an increasing state, and the absolute vehicle speed is in a near-zero speed region at the time of a change of the absolute vehicle speed from the decreasing state to the increasing state in one of a first situation in which the travel direction currently judged is the forward travel direction and the shift position is in a forward range, and a second situation in which the travel direction currently being judged is the reverse travel direction and the shift position is in a reverse range.

16. The continuously-variable transmission shift control apparatus according to claim 14, wherein the further travel direction judging section changes over the travel direction judgment between the forward travel direction and the reverse travel direction when the throttle opening is greater than a predetermined degree, the absolute vehicle speed changes from a decreasing state to an increasing state, and the vehicle speed is in a near-zero speed region at the time of a change of the absolute vehicle speed from the decreasing state to the increasing state in one of a first situation in which the travel direction currently judged is the forward travel direction and the shift position is in a reverse range, and a second situation in which the travel direction currently being judged is the reverse travel direction and the shift position is in a forward range.

17. The toroidal continuously-variable transmission shift control apparatus according to claim 14, wherein the first travel direction judging section does not change over the judgment of the vehicle traveling direction until the absolute vehicle speed enters a near-zero region, even if the shift position is changed from one of a forward range and a reverse range to the other.

18. A continuously-variable transmission shift control apparatus comprising:

a toroidal continuously-variable transmission including a toroidal transmission unit including a power roller disposed between an input disk and an output disk, and a trunnion supporting the power roller;

a shift actuating section to incline the power roller by offsetting the trunnion to achieve a shift control of the toroidal continuously-variable transmission in response to a control command;

means for determining a target transmission ratio, and an actual transmission ratio of the toroidal continuously-variable transmission;

means for controlling the actual transmission ratio toward the target transmission ratio by producing the control command in one selected, from a forward traveling control mode, and a reverse traveling control mode, in accordance with a first parameter representing a driver's intention; and means for detecting a change of a vehicle traveling direction in accordance with a second parameter, and to modify the shift control of the toroidal continuously-variable transmission so as to shift the actual transmission ratio to a speed decreasing side upon detection of the change of the vehicle traveling direction.

19. A continuously-variable transmission shift control apparatus comprising:

a toroidal continuously-variable transmission including a toroidal transmission unit including a power roller disposed between an input disk and an output disk, and a trunnion supporting the power roller;

a shift actuating section to incline the power roller by offsetting the trunnion to achieve a shift control of the toroidal continuously-variable transmission in response to a control command;

a target transmission ratio setting section to set a target transmission ratio;

a transmission ratio sensing section ascertaining an actual transmission ratio of the toroidal continuously-variable transmission;

a controlling section to control the actual transmission ratio toward the target transmission ratio by producing the control command in one of a forward traveling control mode for a forward vehicle traveling state, and a reverse traveling control mode for a reverse vehicle traveling state; and a control modifying section to select one of the forward traveling control mode and the reverse traveling control mode in accordance with a first parameter representing a driver's intention, to detect a change of a vehicle traveling direction in accordance with a second parameter which includes a vehicle speed, and to modify the shift control of the toroidal continuously-variable transmission so as to shift the actual transmission ratio to a speed decreasing side upon detection of the change of the vehicle traveling direction.

20. A shift control process for a toroidal continuously-variable transmission, comprising:

setting a target transmission ratio;

ascertaining an actual transmission ratio of the toroidal continuously-variable transmission;

controlling the actual transmission ratio toward the target transmission ratio in one of a forward traveling control mode for a forward vehicle traveling state, and a reverse traveling control mode for a reverse vehicle traveling state;

selecting one of the forward traveling control mode and the reverse traveling control mode in accordance with a first parameter representing a driver's intention;

detecting a change of a vehicle traveling direction in accordance with a second parameter which is the actual transmission ratio; and modifying the shift control of the toroidal continuously-variable transmission so as to shift the actual transmission ratio to a speed decreasing side upon detection of the change of the vehicle traveling direction.

* * * * *